United States Patent
Jeung et al.

(10) Patent No.: US 10,774,873 B2
(45) Date of Patent: Sep. 15, 2020

(54) POROUS GAS BEARING

(71) Applicant: TRANE INTERNATIONAL INC., Davidson, NC (US)

(72) Inventors: Sung Hwa Jeung, La Crosse, WI (US); Jay H. Johnson, Houston, MN (US); Donald Lee Hill, Cornelius, NC (US); Matthew Cambio, La Crosse, WI (US)

(73) Assignee: TRANE INTERNATIONAL INC., Davison, NC (US)

( * ) Notice: Subject to any disclaimer, the term of this patent is extended or adjusted under 35 U.S.C. 154(b) by 0 days.

(21) Appl. No.: 16/005,415

(22) Filed: Jun. 11, 2018

(65) Prior Publication Data
US 2019/0376556 A1  Dec. 12, 2019

(51) Int. Cl.
*F16C 32/06* (2006.01)
*F16C 31/00* (2006.01)
(Continued)

(52) U.S. Cl.
CPC ........ *F16C 32/0618* (2013.01); *F16C 33/104* (2013.01); *F16C 33/1005* (2013.01);
(Continued)

(58) Field of Classification Search
CPC ...... F16C 17/02; F16C 25/04; F16C 33/1006; F16C 33/104; F16C 35/067;
(Continued)

(56) References Cited

U.S. PATENT DOCUMENTS 2,855,249 A   10/1958 Gerard
3,360,309 A * 12/1967 Voorhies ............... F16C 32/067
                                                         384/119
(Continued)

FOREIGN PATENT DOCUMENTS

CN    104763648 A    7/2015
DE      2514054 A1  10/1976
(Continued)

OTHER PUBLICATIONS

Liu et al. "Measurements of the Rotordynamic Response of a Rotor Supported on Porous Type Gas Bearing," Journal of Engineering for Gas Turbines and Power vol. 140, No. 10, pp. 1-36, Mar. 26, 2018.
(Continued)

*Primary Examiner* — Marcus Charles
(74) *Attorney, Agent, or Firm* — Hamre, Schumann, Mueller & Larson, P.C.

(57) ABSTRACT

A porous gas bearing is disclosed. The porous gas bearing includes a housing having a fluid inlet and an aperture. A porous surface layer is disposed within the housing surrounding the aperture in a circumferential direction. The porous surface layer is in fluid communication with the fluid inlet. A damping system includes a damping system including a biasing member, the biasing member being disposed in a passageway that extends along the longitudinal direction of the aperture and circumferentially about the aperture, wherein the biasing member is arranged radially outward from the porous surface layer.

20 Claims, 19 Drawing Sheets

(51) Int. Cl.
*F16F 15/023* (2006.01)
*F25B 31/00* (2006.01)
*F16C 33/10* (2006.01)

(52) U.S. Cl.
CPC .......... *F16F 15/0237* (2013.01); *F25B 31/00* (2013.01); *F16C 2360/00* (2013.01); *F25B 2400/07* (2013.01); *F25B 2500/16* (2013.01)

(58) Field of Classification Search
CPC .............. F16C 32/0618; F16C 32/0674; F16C 33/1005; F16F 15/237; F16F 15/0237; F01D 25/164; F25B 31/00; F25B 2400/07; F25B 2500/16; F25B 39/00
USPC ........ 384/100, 103, 109, 113–114, 119, 134, 384/152, 275, 397
See application file for complete search history.

(56) References Cited

U.S. PATENT DOCUMENTS

| | | | |
|---|---|---|---|
| 3,407,013 | A | 10/1968 | Weichsel |
| 3,450,448 | A | 6/1969 | Weichsel |
| 3,476,451 | A | 11/1969 | Schwartzman |
| 3,502,920 | A | 3/1970 | Chaboseau |
| 3,527,510 | A | 9/1970 | Christiansen |
| 3,969,822 | A | 7/1976 | Fukuyama |
| 4,118,079 | A * | 10/1978 | Newman ................. F16C 17/03 384/100 |
| 4,848,932 | A * | 7/1989 | Puetz ................... F16C 17/024 384/113 |
| 5,944,489 | A | 8/1999 | Vaughn et al. |
| 6,024,491 | A | 2/2000 | Bak |
| 6,342,270 | B1 * | 1/2002 | Kumamoto ......... F16C 32/0618 427/289 |
| 6,515,288 | B1 | 2/2003 | Ryding et al. |
| 6,623,164 | B1 * | 9/2003 | Gozdawa ................ F16C 17/03 384/117 |
| 6,695,479 | B2 | 2/2004 | Pohn et al. |
| 6,881,027 | B2 | 4/2005 | Klaass et al. |
| 7,108,488 | B2 | 9/2006 | Larue et al. |
| 8,083,413 | B2 | 12/2011 | Ertas |
| 8,753,014 | B2 | 6/2014 | Devitt |
| 8,973,848 | B2 | 3/2015 | van der Steur et al. |
| 9,140,295 | B2 | 9/2015 | Romero |
| 9,416,820 | B2 * | 8/2016 | Ertas ................... F16C 32/0662 |
| 9,429,191 | B2 | 8/2016 | Ertas et al. |
| 9,441,668 | B2 | 9/2016 | Devitt |
| 9,581,169 | B2 | 2/2017 | Klusacek |
| 9,671,139 | B2 | 6/2017 | Creamer |
| 9,784,312 | B1 | 10/2017 | Gu et al. |
| 2002/0176785 | A1 * | 11/2002 | Suitou ................. F04B 27/1063 417/222.2 |
| 2004/0123621 | A1 * | 7/2004 | Okaza .................... C09K 5/041 62/468 |
| 2007/0014494 | A1 | 1/2007 | Wardman et al. |
| 2011/0243762 | A1 | 10/2011 | Daikoku et al. |
| 2012/0297818 | A1 * | 11/2012 | Toyama ................ F04B 39/023 62/470 |
| 2014/0286599 | A1 | 9/2014 | Devitt |
| 2015/0159692 | A1 * | 6/2015 | Dourlens ................ F16C 17/03 384/192 |
| 2015/0275967 | A1 | 10/2015 | Ryu |
| 2015/0362012 | A1 * | 12/2015 | Ermilov ................ F16C 17/024 384/105 |
| 2016/0146248 | A1 | 5/2016 | Ertas et al. |
| 2016/0265588 | A1 | 9/2016 | Devitt et al. |
| 2017/0002824 | A1 | 1/2017 | Hiwata et al. |
| 2017/0010025 | A1 * | 1/2017 | Mayershofer ............ F25B 1/02 |
| 2017/0030354 | A1 * | 2/2017 | Stover .................... F04C 27/005 |
| 2017/0370364 | A1 | 12/2017 | Gu et al. |
| 2018/0066705 | A1 * | 3/2018 | Devitt ................. F16C 32/0618 |
| 2018/0087573 | A1 | 3/2018 | Iannello et al. |

FOREIGN PATENT DOCUMENTS

| | | | |
|---|---|---|---|
| DE | 3815029 A1 | 11/1989 | |
| GB | 796926 A | 6/1958 | |
| JP | 04266615 A * | 9/1992 | .............. F16C 32/06 |
| JP | 11303870 A * | 11/1999 | .............. F16C 32/06 |
| JP | 2007120527 A * | 5/2007 | .......... F16C 32/0618 |
| JP | 2009216232 A | 9/2009 | |
| JP | 2009222351 A * | 10/2009 | ................ F25B 1/00 |
| WO | 2013103732 A2 | 7/2013 | |

OTHER PUBLICATIONS

San Andrés, L., "Modem Lubrication Theory" "Gas Lubrication," Notes 15, Texas A&M University Digital Libraries, Available online at http://repository.tamu.edu/handle/1969.1/93197, pp. 1-58, Sep. 2012.

Sixsmith, H., and Wilson, W.A., "The Theory of a Stable High-Speed Externally Pressurized Gas-Lubricated Bearing," Journal of Research of the National Bureau of Standards—C. Engineering and Instrumentation, vol. 68C, No. 2, pp. 101-114, Jan. 15, 1964.

S. Yoshimoto, "Improvement of static characteristics of an aerostatic journal bearing using the elastic deformation of an O-ring," Tribology International, vol. 20, No. 5, pp. 290-296, Oct. 1987.

Al-Bender, F. et al., "Dynamic Characterization of Rubber O-Rings: Squeeze and Size Effects," Advances in Tribology vol. 2017, Article ID 2509879, 12 pages, Jul. 12, 2017.

John Vance et al., "Fluid Seals and Their Effect on Rotordynamics", Machinery Vibration and Rotor Dynamics, pp. 271-352, 2010.

Extended European Search Report; European Patent Application No. 19179284.5, dated Nov. 13, 2019 (11 pages).

* cited by examiner

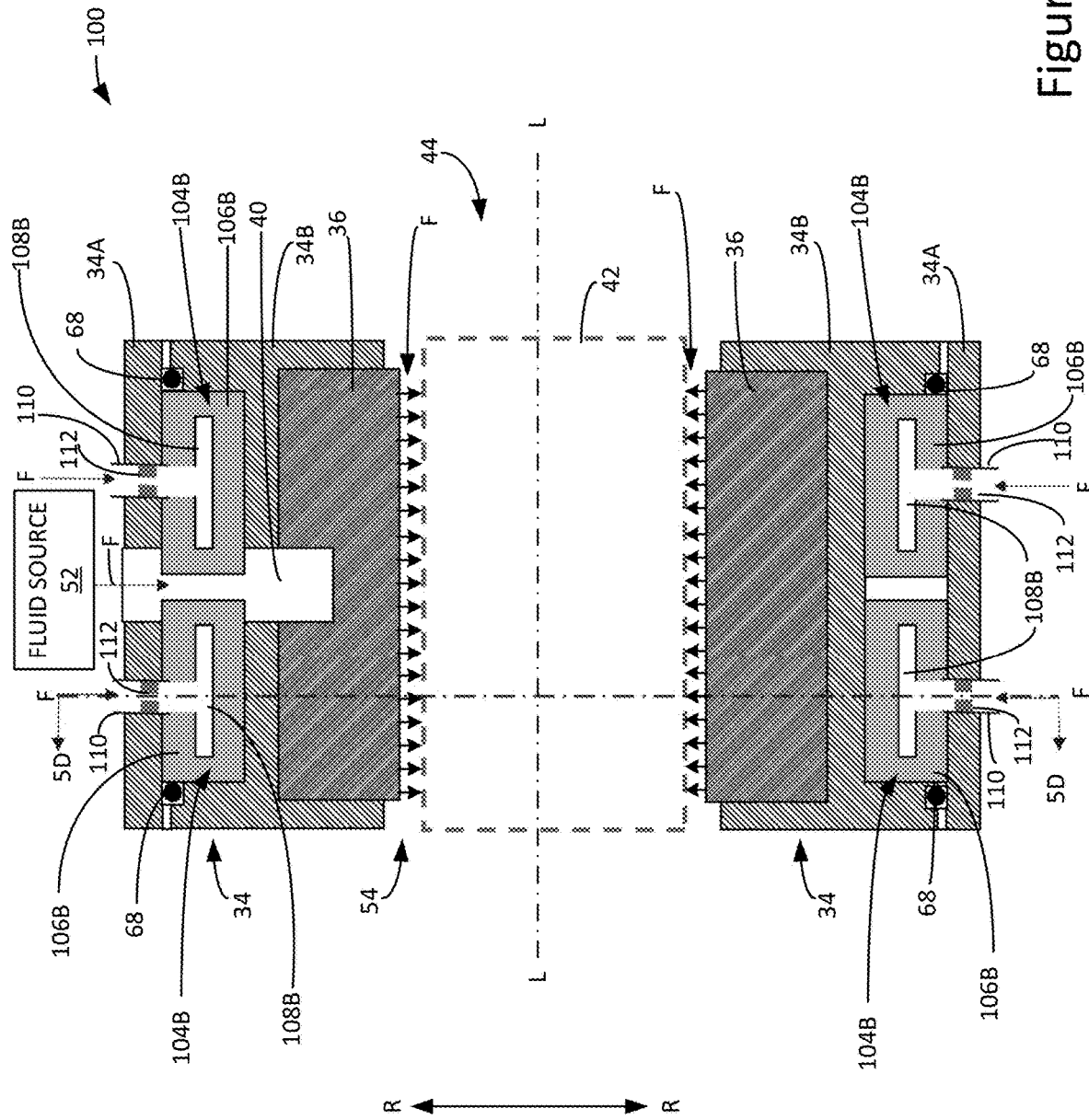

us 10,774,873 B2

POROUS GAS BEARING

FIELD

This description relates generally to a bearing for a heating, ventilation, air conditioning, and refrigeration (HVACR) system. More specifically, this description relates to a porous gas bearing for a compressor in the HVACR system.

BACKGROUND

A heating, ventilation, air conditioning, and refrigeration (HVACR) system generally includes a compressor. Compressors, such as, but not limited to, centrifugal compressors, screw compressors, and scroll compressors, utilize bearings to support a spinning shaft. Various types of bearings have been considered, including hydrodynamic oil bearings and ball bearings, which require a lubricant system. In some circumstances, an oil-free operation is preferred. Such systems often utilize a magnetic bearing. Magnetic bearings do not utilize a lubricant, but can be expensive and require a control system.

HVACR systems can be utilized for a building or may be utilized in a transport application (e.g., trucks, cars, buses, trains, etc.).

SUMMARY

This description relates generally to a bearing for a heating, ventilation, air conditioning, and refrigeration (HVACR) system. More specifically, this description relates to a porous gas bearing for a compressor in the HVACR system.

In an embodiment, a porous gas bearing is disclosed. The porous gas bearing can be used to, for example, support a shaft such as, but not limited to, a compressor shaft of a compressor in an HVACR system. In an embodiment, the compressor can be a centrifugal compressor. In an embodiment, the centrifugal compressor is an oil-free centrifugal compressor.

The porous gas bearing can include a damping feature. In an embodiment, the porous gas bearing can include a plurality of damping features. The damping feature can, for example, reduce an amount of radial displacement of a shaft in a compressor.

A porous gas bearing is disclosed. The porous gas bearing includes a housing having a fluid inlet and an aperture. A porous surface layer is disposed within the housing surrounding the aperture in a circumferential direction. The porous surface layer is in fluid communication with the fluid inlet. A damping system includes a biasing member. The biasing member is disposed in a passageway that extends along the longitudinal direction of the aperture and circumferentially about the aperture. The biasing member is arranged radially outward from the porous surface layer.

A refrigerant circuit is disclosed. The refrigerant circuit includes a compressor, a condenser, an expansion device, and an evaporator fluidly connected. The compressor includes a shaft. The shaft is supported by a porous gas bearing. The porous gas bearing includes a housing having a fluid inlet and an aperture. A porous surface layer is disposed within the housing surrounding the aperture in a circumferential direction. The porous surface layer is in fluid communication with the fluid inlet. A damping system includes a biasing member. The biasing member being is disposed in a passageway that extends along the longitudinal direction of the aperture and circumferentially about the aperture. The biasing member is arranged radially outward from the porous surface layer.

A centrifugal compressor is disclosed. The centrifugal compressor includes a shaft that rotates and a porous gas bearing. The porous gas bearing includes a housing having a fluid inlet and an aperture. A porous surface layer is disposed within the housing surrounding the aperture in a circumferential direction. A porous surface layer is disposed within the housing surrounding the aperture in a circumferential direction. The porous surface layer is in fluid communication with the fluid inlet. A damping system includes a biasing member. The biasing member being is disposed in a passageway that extends along the longitudinal direction of the aperture and circumferentially about the aperture. The biasing member is arranged radially outward from the porous surface layer.

BRIEF DESCRIPTION OF THE DRAWINGS

References are made to the accompanying drawings that form a part of this disclosure and which illustrate embodiments in which the systems and methods described in this specification can be practiced.

FIGS. 5A-5D are schematic views of a porous gas bearing having a damping system, according to an embodiment.

Like reference numbers represent like parts throughout.

DETAILED DESCRIPTION

This description relates generally to a bearing for a heating, ventilation, air conditioning, and refrigeration (HVACR) system. More specifically, this description relates to a porous gas bearing for a compressor in the HVACR system.

A porous gas bearing, as used in this specification, generally includes a layer of porous material on a bearing surface that includes an evenly distributed fluid flow over the porous surface. In an embodiment, the fluid flow can be a gas. In an embodiment, the fluid flow can be a mixture of a gas and a liquid.

In an embodiment, the porous gas bearing can be utilized in place of a hydrodynamic oil bearing, a ball bearing, a magnetic bearing, or the like. In particular, the porous gas bearing can be utilized in a compressor (e.g., a centrifugal compressor, etc.) of an HVACR system to provide a lubricant free system. Typically, porous gas bearings may provide a limited amount of damping due to a relatively low viscosity of the working fluid. In the embodiments disclosed in this specification, various damping systems are disclosed that can address the limited damping of porous gas bearings. Additionally, embodiments disclosed in this specification can include a porous gas bearing that utilizes refrigerant as the working fluid, which can increase a viscosity of the working fluid and can, for example, provide advantageous heat transfer properties to reduce a likelihood of bearing seizure due to thermal expansion of a shaft supported by the porous gas bearing.

Figure 1:
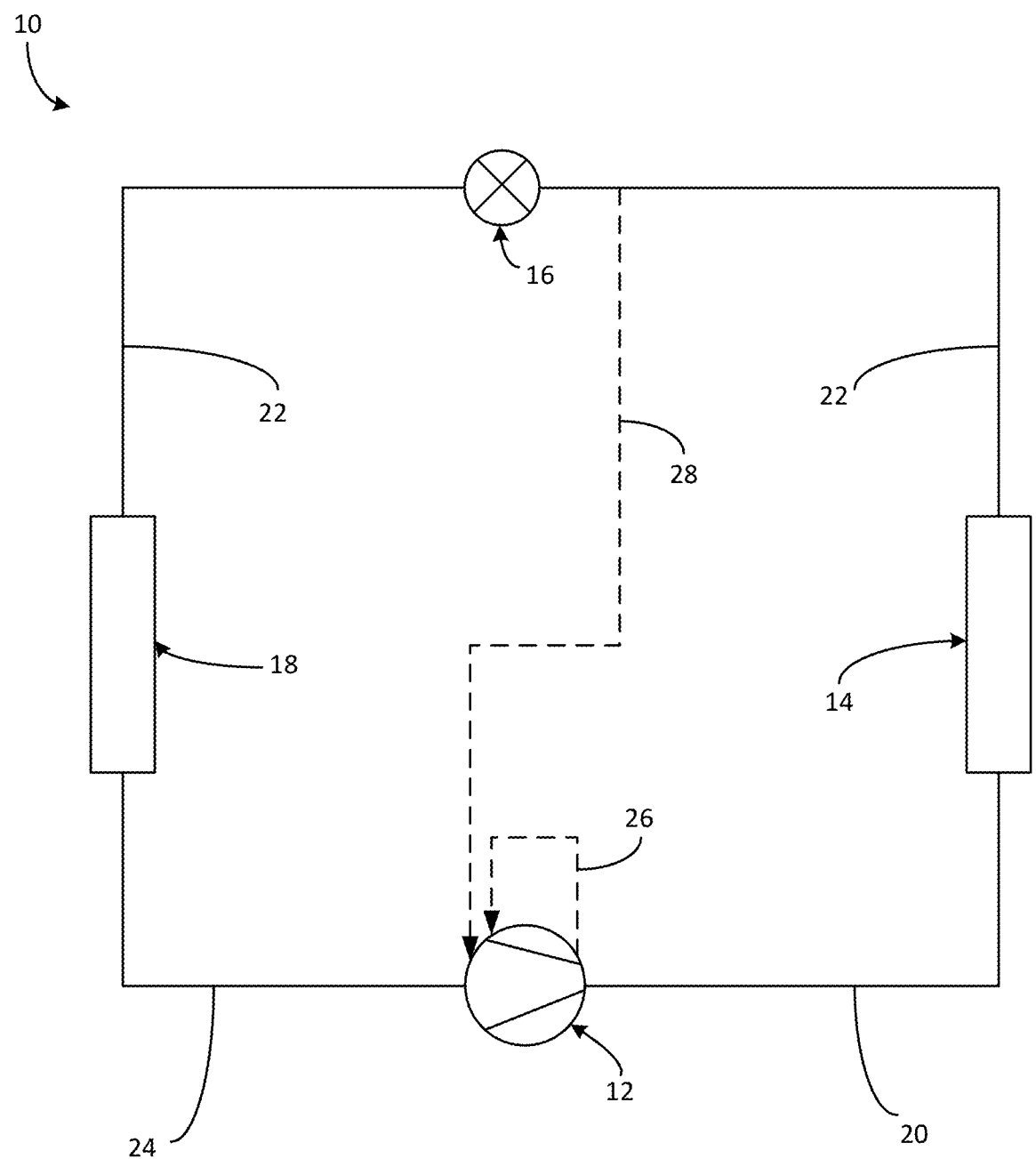
FIG. 1 is a schematic diagram of a refrigeration circuit, according to an embodiment.

FIG. 1 is a schematic diagram of a refrigerant circuit 10, according to an embodiment. The refrigerant circuit 10 generally includes a compressor 12, a condenser 14, an expansion device 16, and an evaporator 18.

The refrigerant circuit 10 is an example and can be modified to include additional components. For example, in an embodiment, the refrigerant circuit 10 can include other components such as, but not limited to, an economizer heat exchanger, one or more flow control devices, a receiver tank, a dryer, a suction-liquid heat exchanger, or the like.

The refrigerant circuit 10 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 12, condenser 14, expansion device 16, and evaporator 18 are fluidly connected via refrigerant lines 20, 22, 24. In an embodiment, the refrigerant lines 20, 22, and 24 can alternatively be referred to as the refrigerant conduits 20, 22, and 24, or the like.

In an embodiment, the refrigerant circuit 10 can be configured to be a cooling system (e.g., an air conditioning system) capable of operating in a cooling mode. In an embodiment, the refrigerant circuit 10 can be configured to be a heat pump system that can operate in both a cooling mode and a heating/defrost mode.

The refrigerant circuit 10 can operate according to generally known principles. The refrigerant circuit 10 can be configured to heat or cool a gaseous process fluid (e.g., a heat transfer medium or fluid such as, but not limited to, air or the like), in which case the refrigerant circuit 10 may be generally representative of an air conditioner or heat pump.

In operation, the compressor 12 compresses a working fluid (e.g., a heat transfer fluid such as a refrigerant or the like) from a relatively lower pressure gas to a relatively higher-pressure gas. In an embodiment, the compressor 12 can be a centrifugal compressor. In an embodiment, the centrifugal compressor can operate at different speed ranges based on, for example, the compressor size and type. For example, in an embodiment, the centrifugal compressor can operate from at or about 10,000 revolutions per minute (RPM) to at or about 150,000 revolutions per minute (RPM). In an embodiment, the compressor 12 can be a screw compressor, a scroll compressor, or the like.

The relatively higher-pressure gas is also at a relatively higher temperature, which is discharged from the compressor 12 and flows through refrigerant line 20 to the condenser 14. The working fluid flows through the condenser 10 and rejects heat to a process fluid (e.g., water, air, etc.), thereby cooling the working fluid. The cooled working fluid, which is now in a liquid form, flows to the expansion device 16 via the refrigerant line 22. The expansion device 16 reduces the pressure of the working fluid. As a result, a portion of the working fluid is converted to a gaseous form. The working fluid, which is now in a mixed liquid and gaseous form flows to the evaporator 18 via the remainder of refrigerant line 22. The working fluid flows through the evaporator 18 and absorbs heat from a process fluid (e.g., water, air, etc.), heating the working fluid, and converting it to a gaseous form. The gaseous working fluid then returns to the compressor 12 via the refrigerant line 24. The above-described process continues while the refrigerant circuit is operating, for example, in a cooling mode (e.g., while the compressor 12 is enabled).

In the illustrated embodiment, a first fluid line 26 can be connected at a location at which fluid may be drawn from the compressor 12 and provided to a porous gas bearing in the compressor 12. In an embodiment, fluid line 26 can be connected at a location at which fluid provided to the porous gas bearing is gaseous or substantially gaseous. Embodiments of porous gas bearings are discussed in additional detail in accordance with FIGS. 2A-9B below. A second fluid line 28 can be connected at a location at which fluid may be drawn from the refrigerant line 22 and provided to the porous gas bearing. In an embodiment, fluid line 28 can be connected at a location at which fluid provided to the porous gas bearing is in a mixed state including at least a portion that is liquid and at least a portion that is gaseous. It will be appreciated that the first fluid line 26 can be included in the refrigerant circuit 10, the second fluid line 28 can be included in the refrigerant circuit 10, or both the first and second fluid lines 26, 28 can be included in the refrigerant circuit 10.

Figure 2A:
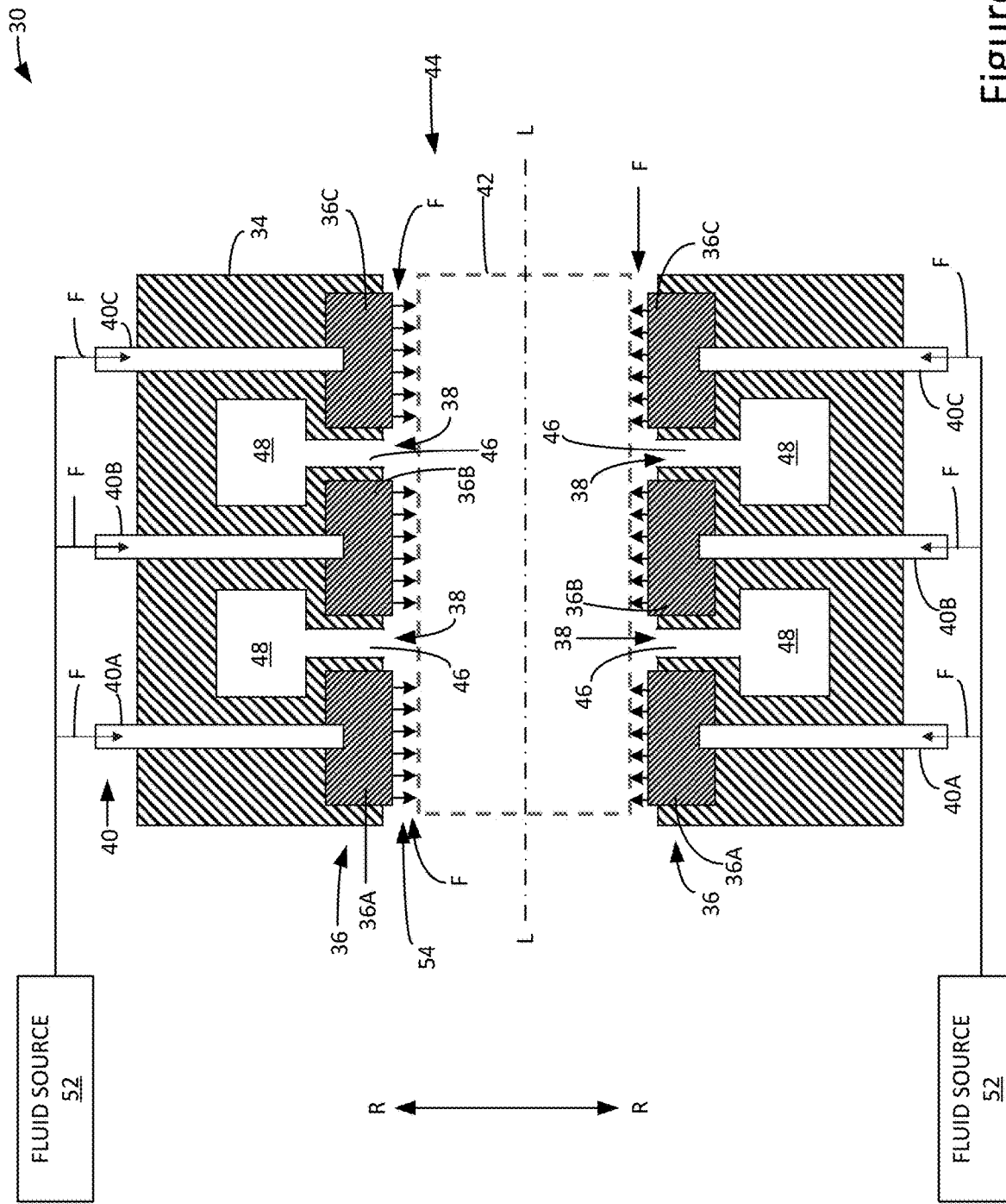
FIGS. 2A-2C are schematic views of a porous gas bearing having a damping system, according to an embodiment.
Figure 2B:
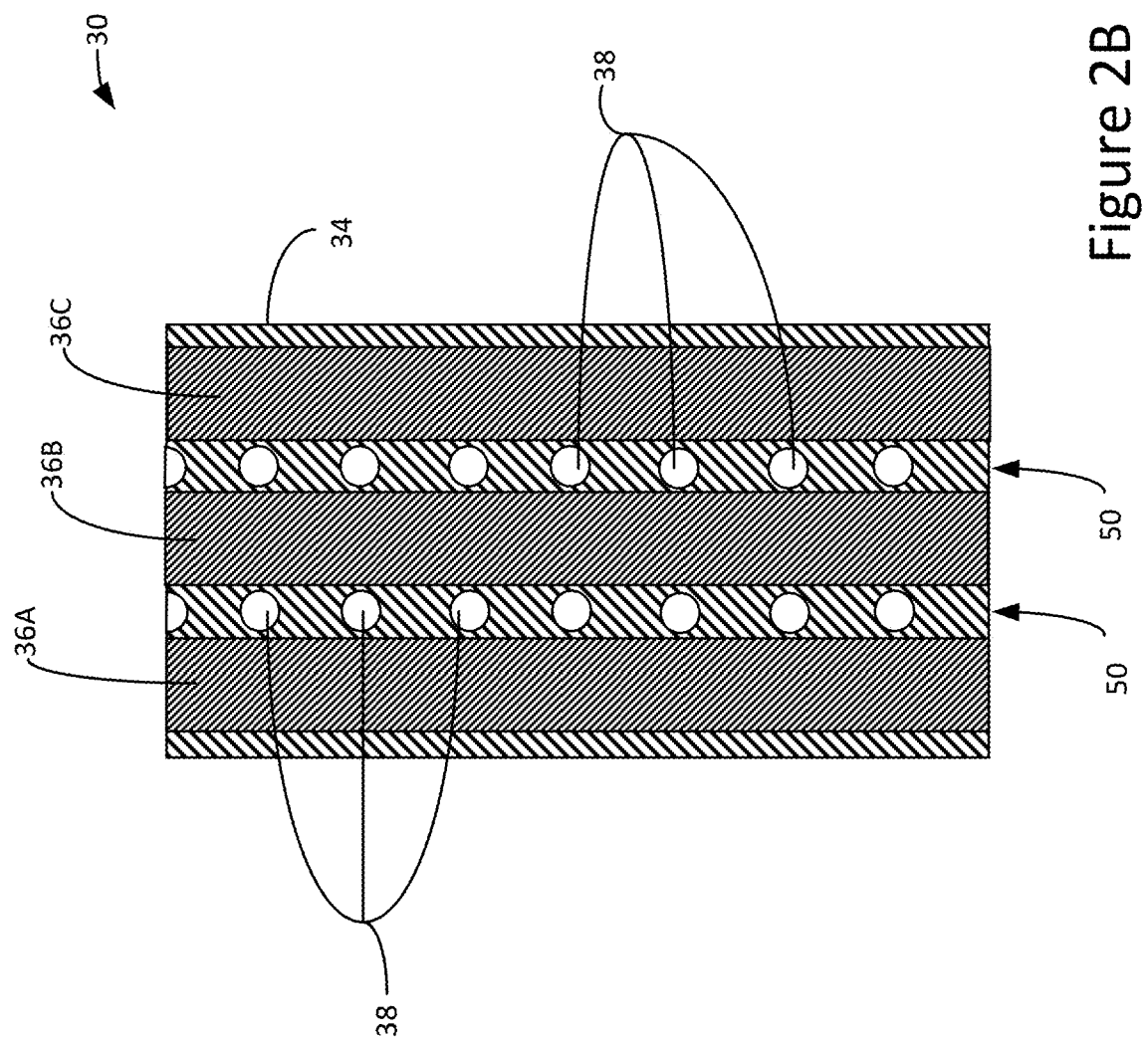
Figure 2C:
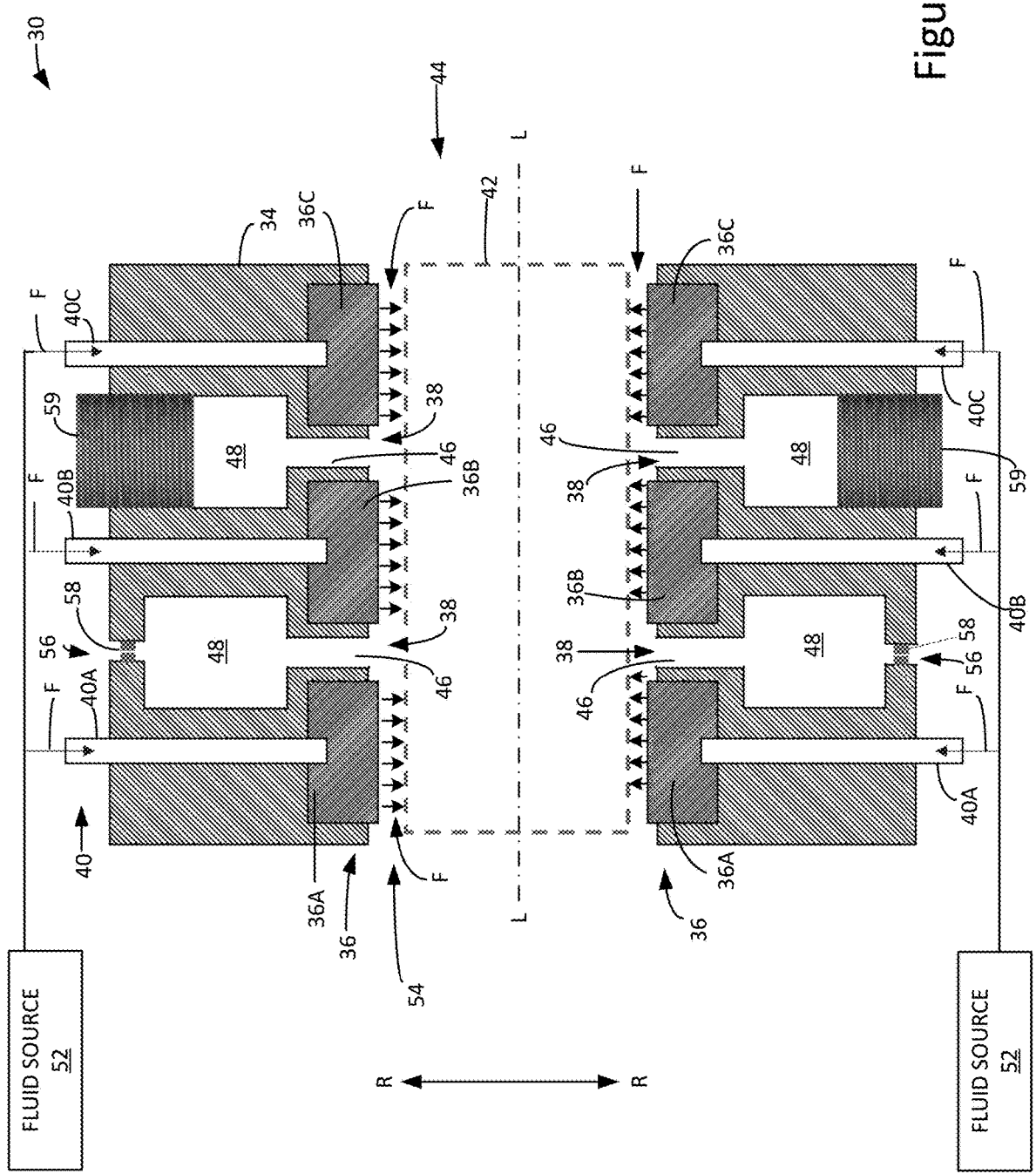

FIGS. 2A-2C are schematic views of a porous gas bearing 30 having a damping system, according to an embodiment. FIG. 2A is an axial cross-section of the porous gas bearing 30, according to an embodiment. FIG. 2B is a view of an inner surface of the porous gas bearing 30 if unwound, according to an embodiment. FIG. 2C is an axial cross-section of the porous gas bearing 30 including modifications to the damping system, according to an embodiment.

The porous gas bearing 30 in FIGS. 2A-2C can be utilized in a compressor (e.g., compressor 12 in FIG. 1) of a refrigerant circuit (e.g., refrigerant circuit 10 in FIG. 1) of an HVACR system.

The porous gas bearing 30 with damping system includes a housing 34, a porous surface layer 36, and dampers 38 formed within the housing 34.

The porous surface layer 36 extends from a first end of the housing 34 to a second end of the housing 34. In the illustrated embodiment, the porous surface layer 36 includes a plurality of segments 36A-36C. Each segment 36A-36C is spaced apart from another segment 36A-36C. Opposing ends of the individual segments 36A and 36B are longitudinally spaced from each other. Opposing ends of the individual segments 36B and 36C are longitudinally spaced from each other. The segments are separated by a circumferential groove 50 in which the dampers 38 are formed. (See FIG. 2B). It will be appreciated that a number and size of the segments 36A-36C can vary. The number and size of the segments 36A-36C can be selected to provide a selected amount of damping and a selected stiffness for the porous gas bearing 30. The porous surface layer 36 can, in an embodiment, be made of a porous carbon graphite material. In an embodiment, the porous surface layer 36 can be any suitable porous material to accomplish the functionality described in this specification. In an embodiment, a porosity of the material can vary based on application and operating conditions. In an embodiment, the porous surface layer 36 can have a porosity of at or about 10% to at or about 30%.

The porous surface layer 36 is in fluid communication with a fluid inlet 40. It will be appreciated that a number of fluid inlets 40 can be based on a number of the segments 36A-36C of the porous surface layer 36. That is, in the illustrated embodiment, there are three fluid inlets 40A, 40B, and 40C, which correspond to the porous surface layers 36A, 36B, 36C. In an embodiment, there may be a single fluid inlet 40 that is split to be provided to the porous surface layer 36. Such an embodiment is shown and described in accordance with FIG. 7 below.

A shaft 42 can be provided within an aperture 44 of the housing 34. The shaft 42 includes a longitudinal axis L-L that extends along a length of the shaft 42. In an embodiment, a clearance between the shaft 42 and the porous surface layer 36 can be at or about 2 microns to at or about 100 microns. A larger clearance means lower stiffness and larger leakage through the porous gas bearing 30. The selection of the clearance can depend, for example, upon the required stiffness of the rotor-bearing system. A radial direction R is shown in the figure. In operation, the shaft 42 rotates about the longitudinal axis L-L. The shaft 42 is subject to deflection in the radial direction R. To reduce an amount of movement in the radial direction R, the dampers 38 of the damping system can receive fluid F from the displacement of the shaft 42.

The dampers 38 include a damper inlet 46 and a damper chamber 48. The dampers 38 are illustrated as being fluidly separate in FIG. 2A. It will be appreciated that the dampers 38 can be fluidly connected. The damper inlet 46 and the damper chamber 48 can be sized (e.g., to a selected volume, etc.) to provide a selected amount of damping.

In an embodiment, the dampers 38 can be configured differently at different locations along the longitudinal axis L-L of the shaft 42. In an embodiment, this can, for example, provide selective damping at particular locations of the shaft 42 that may be subject to more radial movement than other locations of the shaft 42.

In an embodiment, the dampers 38 may be machined into the housing 34 via the aperture 44. In an embodiment, it may be relatively simpler to manufacture the dampers 38 by machining the housing 34 from a radial outer direction toward the aperture 44. In such an embodiment, the housing 34 may be mechanically capped to prevent fluid from escaping the dampers 38. For example, with reference to FIG. 2C, a bolt 59 can be inserted into the damper chamber 48. In such an embodiment, a volume of the damper chamber 48 may be determined based on how far into the damper chamber 48 the bolt 59 is inserted.

With reference to FIG. 2B, the dampers 38 may be disposed in a circumferential groove 50 that is located between the segments 36A-36C of the porous surface layer 36.

In operation, a fluid flow F is provided from a fluid source 52. The fluid source 52 can include, for example, fluid diverted from a refrigerant circuit (e.g., the refrigerant circuit 10 in FIG. 1). In an embodiment, the fluid source 52 can be a source that is fluidly separate from the refrigerant circuit 10.

In an embodiment, the fluid can be diverted from a location via which a two-phase mixture (e.g., gas and liquid) is provided to the fluid inlets 40. In such an embodiment, the two-phase mixture can reduce an amount of heat generated by the porous gas bearing 30. In an embodiment, reducing an amount of heat can, for example, reduce the likelihood of bearing seizure caused by thermal growth of the shaft 42. In an embodiment, the two-phase mixture can also increase a viscosity of the working fluid for the porous gas bearing 30, thereby increasing a loading capacity of the porous gas bearing 30.

In an embodiment, a consideration for the fluid flow F is to provide a suitable pressure to form a fluid layer 54 between the shaft 42 and the porous surface layer 36. It will be appreciated that a pressure of the fluid flow F is relatively more important than a flow rate of the fluid flow. In an embodiment, the pressure of the fluid flow F can be based on a discharge pressure of the compressor (e.g., compressor 12 in FIG. 1). A particular pressure may be selected based on a size (e.g., a weight) of a rotor and impeller assembly of the compressor 12. A minimum pressure can be determined based on when the rotor and impeller assembly lift (e.g., are spaced) from the porous gas bearing 30. It will be appreciated that the pressure of the fluid flow F can depend on a refrigerant type and compressor operating range. Examples of pressure ranges for representative refrigerants can include, but are not limited to, at or about 2 bar to at or about 24 bar for R-134a; at or about 4 bar to at or about 55 bar for R-410A; at or about 1 bar to at or about 20 bar for R-1234ze; at or about 2 bar to at or about 24 bar for R-513A; and at or about 0.5 bar to at or about 3.5 bar for R-1233zd.

Referring again to FIG. 2C, the damper chambers 48 can also be provided with an aperture 56. The aperture 56 can include an orifice 58 that is selectively sized to enable fluid F to escape from the damper chamber 48. This can, for example, prevent over-pressurization of the damper chamber 48. It will be appreciated that the aperture 56 and orifice 58 are optional and may not be included in the housing 34. If included, the orifice 58 would be fluidly connected to the fluid source 52 so that fluid leaving the orifice is returned to the fluid source 52.

Figure 3A:
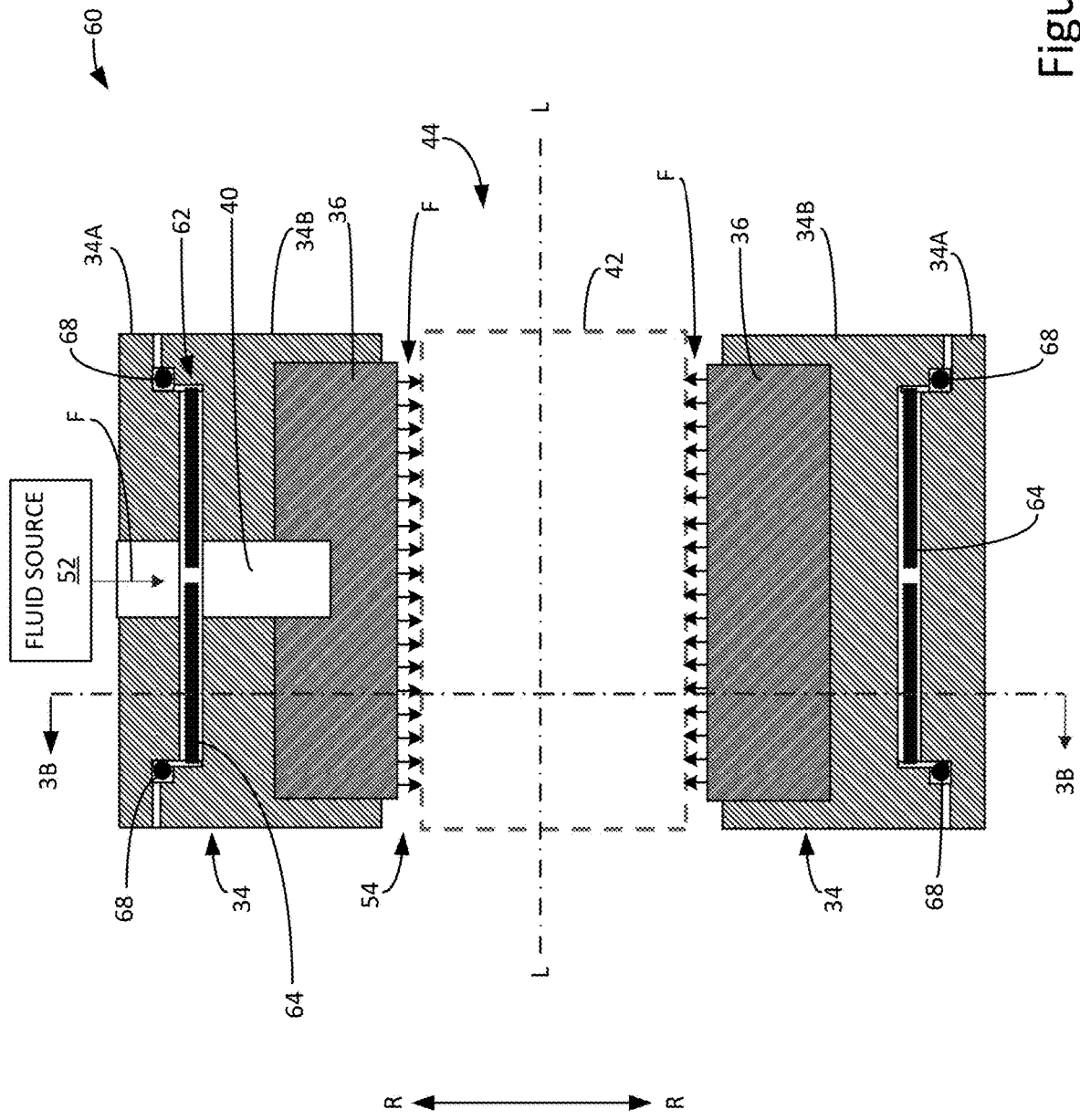
FIGS. 3A and 3B are schematic views of a porous gas bearing having a damping system, according to an embodiment.
Figure 3B:
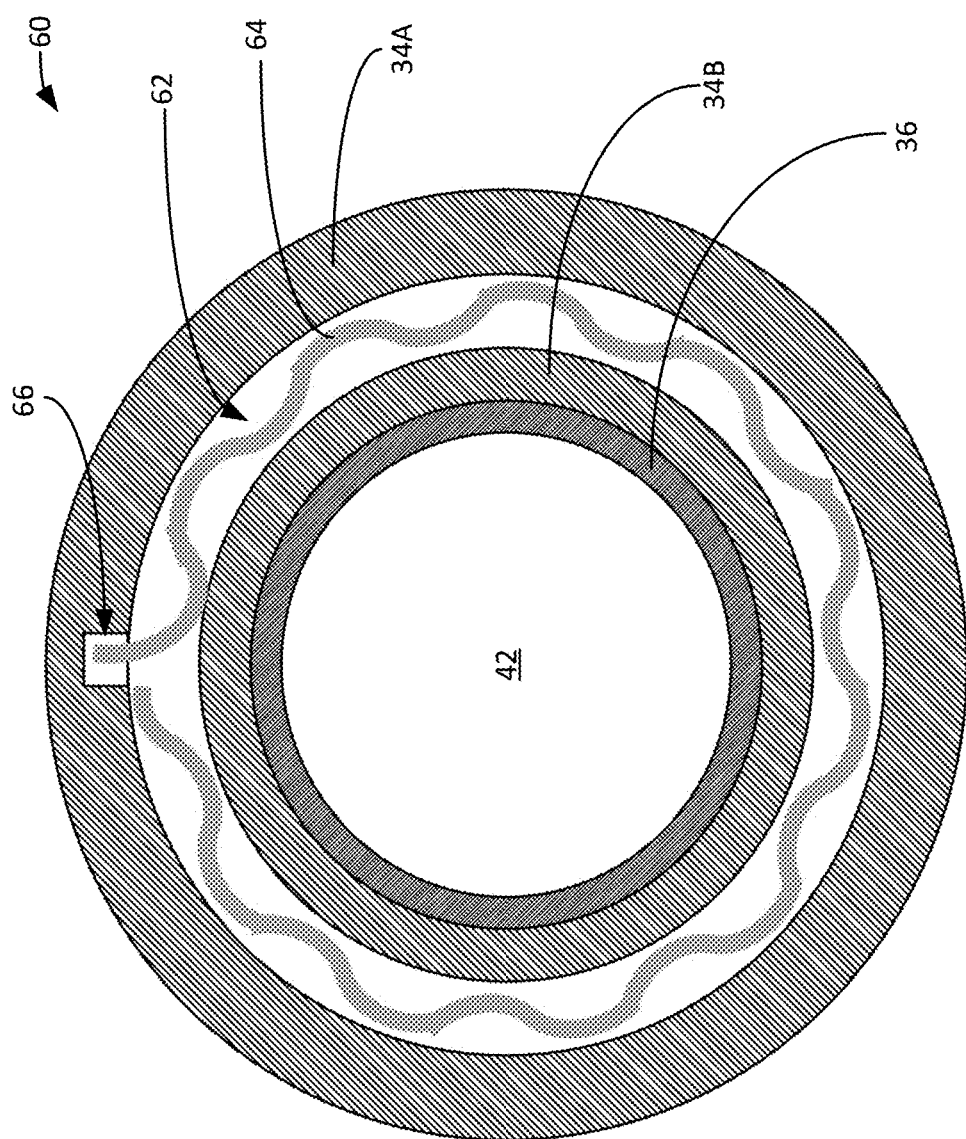

FIGS. 3A and 3B show a porous gas bearing 60 with a damping system, according to an embodiment. FIG. 3A is an axial cross-section of the porous gas bearing 60 along the longitudinal axis L-L of the shaft 42. FIG. 3B is a radial cross-section of the porous gas bearing 60. Unless specific reference is made, FIGS. 3A and 3B will be described generally.

Features of the porous gas bearing 60 may be the same as or similar to features of the porous gas bearing 30 (FIGS. 2A, 2B). Such features are labeled with like reference numbers and are generally not described in additional detail.

In the illustrated embodiment, the damping system includes a biasing member 64 disposed in a passageway 62. In an embodiment, the biasing member 64 can be a spring 64. In an embodiment, the spring 64 can include a wave spring 64. In an embodiment, the spring 64 can be installed in the porous gas bearing 60 under tension. The pre-loading tension of the spring 64 can be selected to control an amount of damping provided by the spring 64 when the porous gas bearing 60 is in use.

The porous gas bearing 60 with the damping system includes the housing 34. In the illustrated embodiment, the housing 34 can include a first segment 34A and a second segment 34B. The first segment 34A may be disposed radially outward (with respect to the shaft 42) of the second segment 34B. The damping system (e.g., the biasing member 64) is disposed between the first segment 34A and the second segment 34B of the housing 34.

As shown in FIG. 3B, in an embodiment, the first segment 34A of the housing 34 can include a retainer 66. In an embodiment, the retainer 66 can be a notch 66. An end section of the biasing member 64 can be inserted into the retainer 66. The arrangement of the biasing member 64 in the retainer 66 can, for example, prevent the biasing member 64 from moving (e.g., spinning, etc.) about the longitudinal axis L-L. It will be appreciated that the retainer 66 may be optional. In an embodiment, if the retainer 66 is not present, the spring may move within the housing 34. However, because the biasing member 64 can be pre-loaded, the movement within the housing 34 may be minimal.

In operation, the shaft 42 rotates about the longitudinal axis L-L. The shaft 42 is subject to deflection in the radial direction R. To reduce an amount of movement in the radial direction R, the biasing member 64 of the damping system can absorb force (e.g., be compressed) from the displacement of the shaft 42 in the radial direction R.

A plurality of O-rings 68 are disposed at ends of the housing 34 to fluidly seal the passageway 62. In an embodiment, the O-rings 68 can provide damping if the biasing member 64 is compressed. In an embodiment, the O-rings 68 can also account for slight misalignment between bearings disposed at different locations of the shaft 42.

According to an embodiment, the damping system of the porous gas bearing 60 and the damping system of the porous gas bearing 30 can be combined in a single embodiment to include the dampers 38 and the biasing member 64.

Figure 4A:
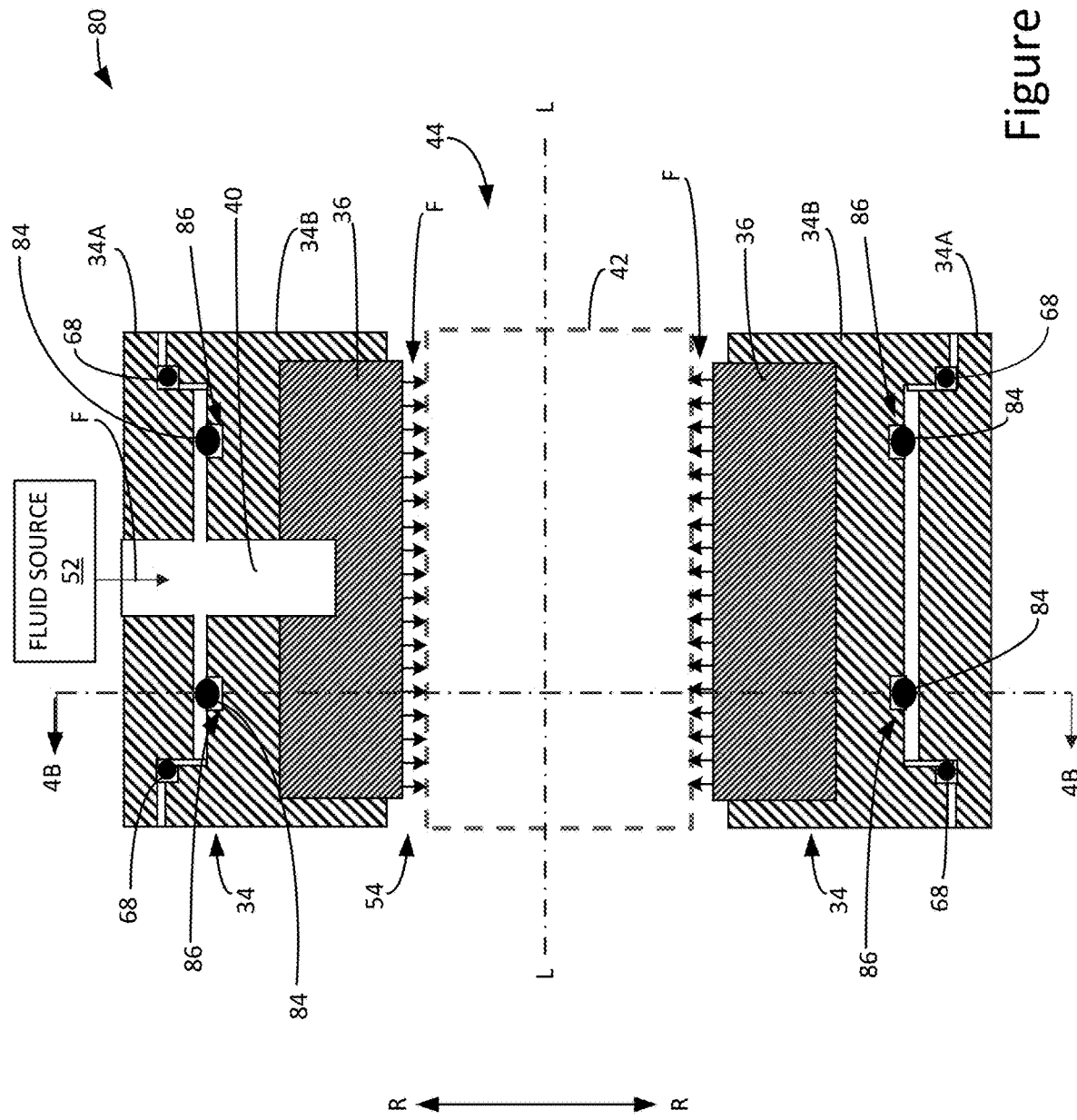
FIGS. 4A and 4B are schematic views of a porous gas bearing having a damping system, according to an embodiment.
Figure 4B:
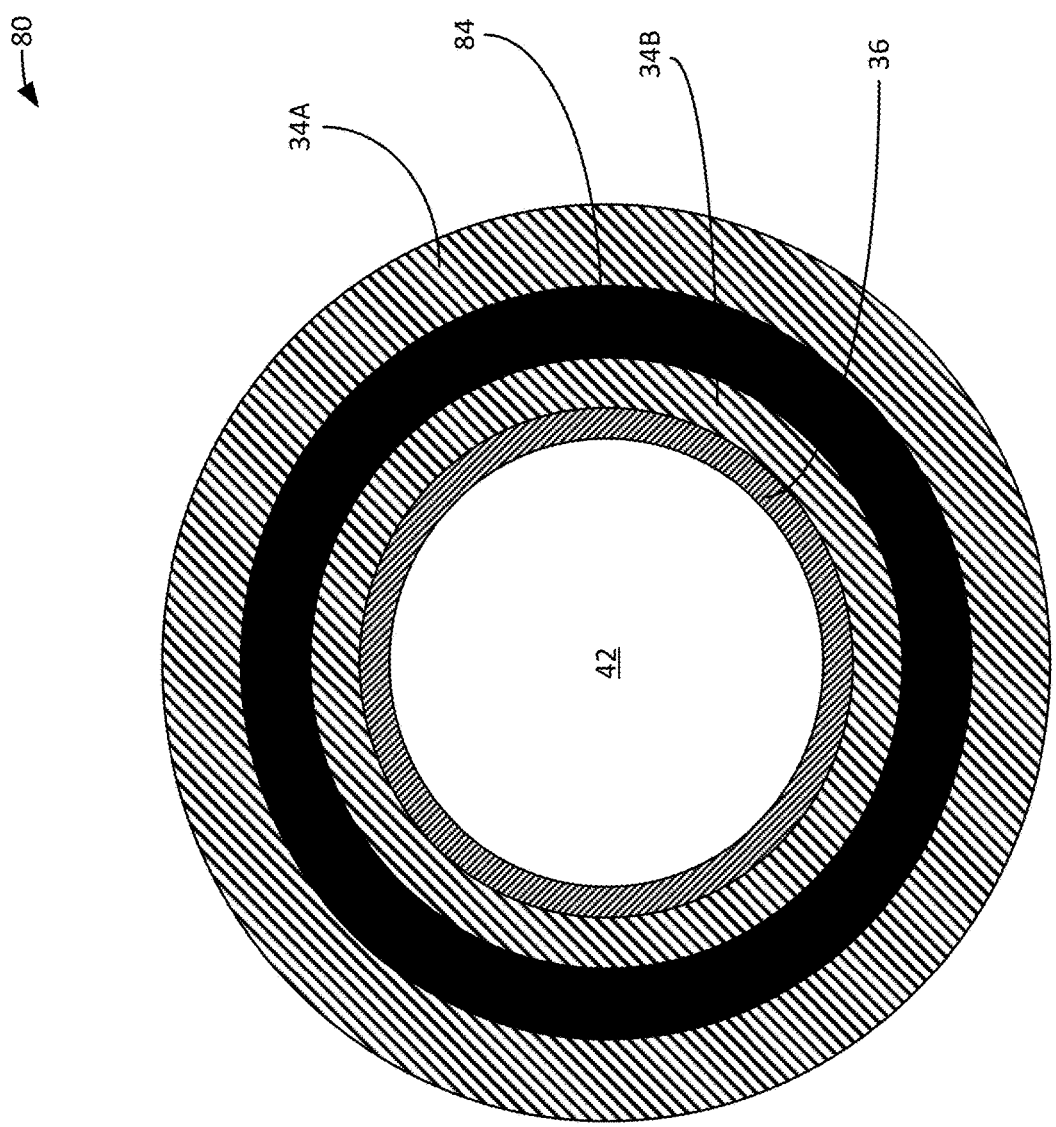

FIGS. 4A and 4B show a porous gas bearing 80 with a damping system, according to an embodiment. FIG. 4A is an axial cross-section of the porous gas bearing 80 along the longitudinal axis L-L of the shaft 42. FIG. 4B is a radial cross-section of the porous gas bearing 80. Unless specific reference is made, FIGS. 4A and 4B will be described generally.

Features of the porous gas bearing 80 may be the same as or similar to features of the porous gas bearing 30 (FIGS. 2A, 2B, 2C) and the features of the porous gas bearing 60 (FIGS. 3A, 3B).

In the illustrated embodiment, the damping system includes a plurality of biasing members 84. In an embodiment, the plurality of biasing members 84 can include a plurality of O-rings 84. In an embodiment, the plurality of O-rings 84 can include two O-rings 84. It will be appreciated that a number of the biasing members 84 can vary depending on a desired amount of damping to be provided by the damping system.

The porous gas bearing 80 having the damping system includes the housing 34. In the illustrated embodiment, the housing 34 includes the first segment 34A and the second segment 34B. The first segment 34A may be disposed radially outward (with respect to the shaft 42) of the second segment 34B. The damping system (e.g., the biasing member 84) is disposed between the first segment 34A and the second segment 34B of the housing 34.

As shown in FIG. 4A, the second segment 34B of the housing 34 can include a plurality of retainers 86 (e.g., notches 86). The plurality of retainers 86 can provide a fixed location at which the biasing members 84 can be disposed and to prevent the biasing members 84 from being able to move axially (e.g., in a direction that is parallel to the longitudinal axis L-L). In an embodiment, the biasing members 84 can be made of a material that is compatible with refrigerant and lubricants for refrigerant. Examples of suitable materials include, but are not limited to, epichlorohydrin, nitrile, neoprene, viton, and the like.

According to an embodiment, the damping system of the porous gas bearing 80 and the damping systems of one or more of the porous gas bearings 30 and 60 can be combined in a single embodiment to include the dampers 38, the biasing member 64, and the biasing members 84.

Figure 5A:
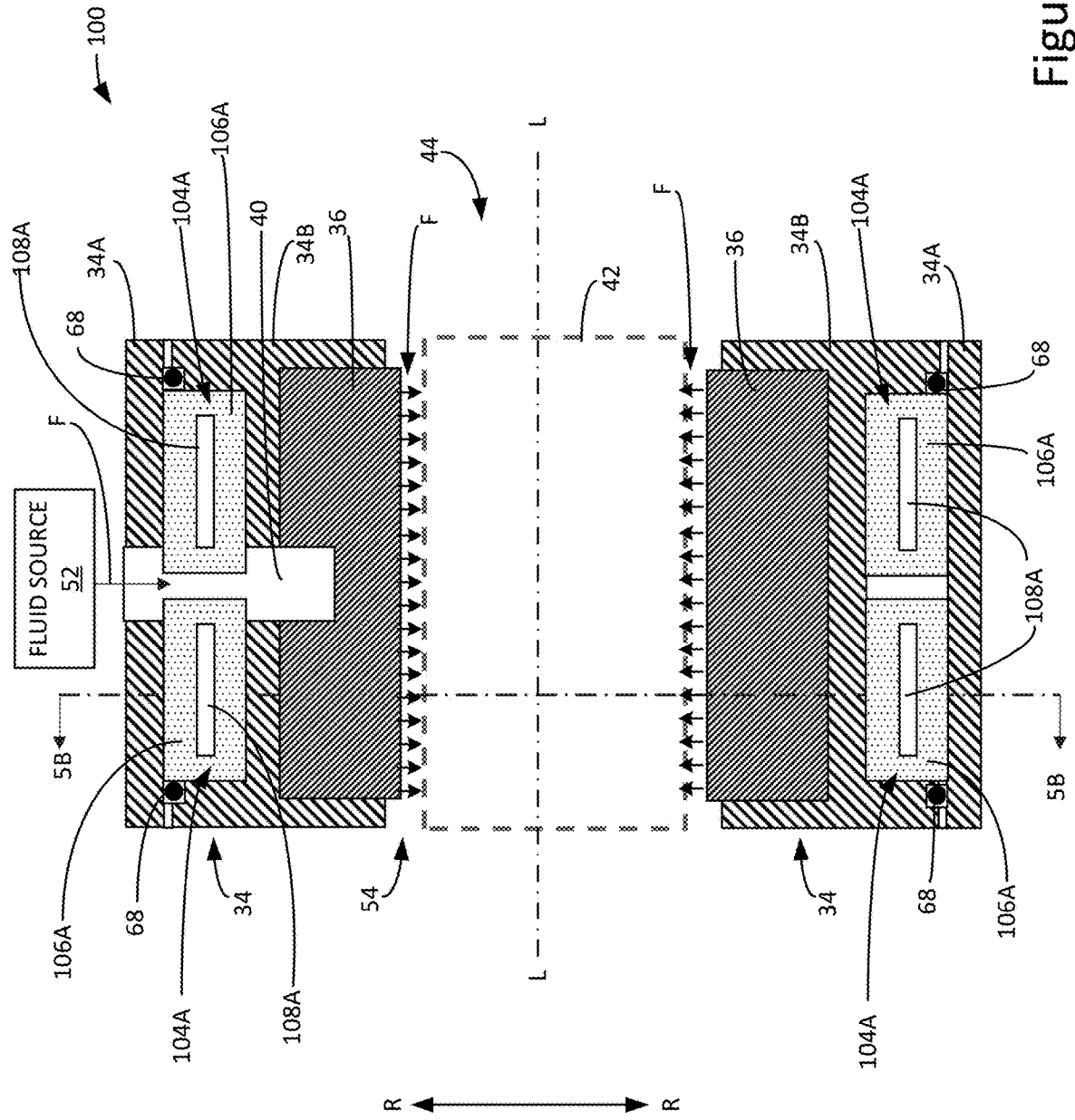
Figure 5B:
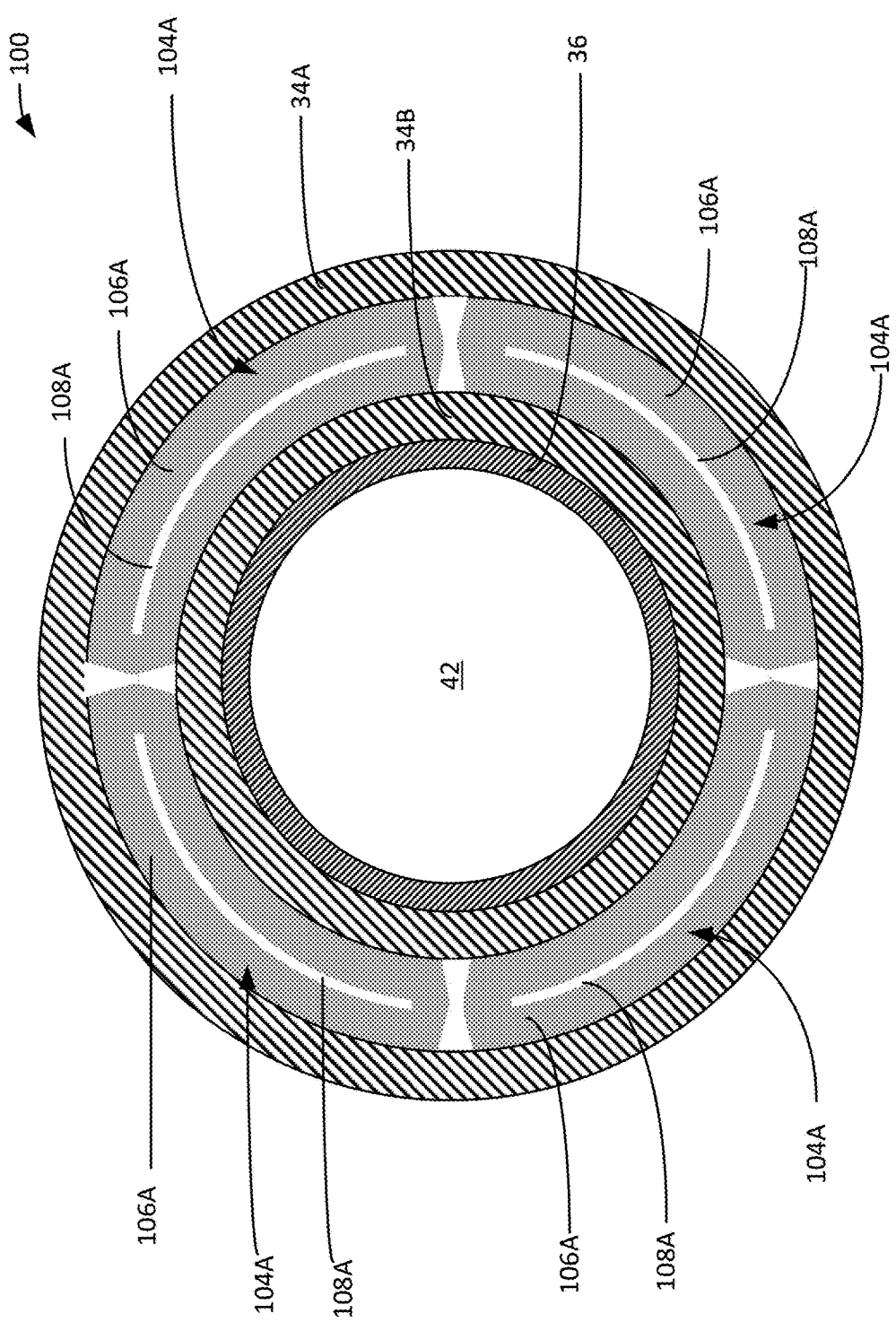
Figure 5D:
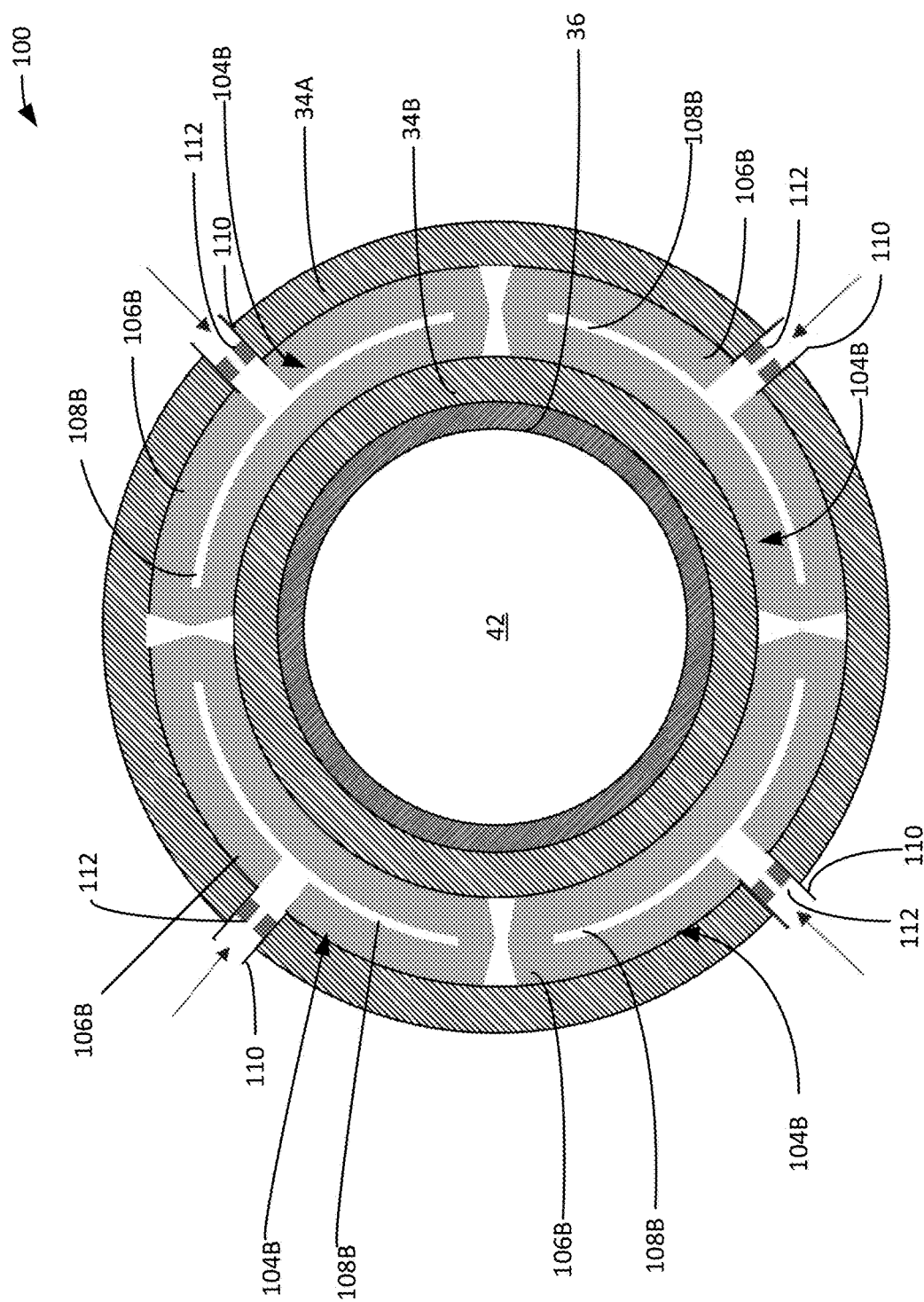

FIGS. 5A-5D show a porous gas bearing 100 with a damping system, according to an embodiment. FIG. 5A is an axial cross-section of the porous gas bearing 100 along the longitudinal axis L-L of the shaft 42. FIG. 5B is a radial cross-section of the porous gas bearing 100. FIG. 5C is an axial cross-section of the porous gas bearing 100 and the damping system of FIG. 5D along the longitudinal axis L-L of the shaft 42. FIG. 5D is a radial cross-section of the porous gas bearing 100 having a modified damping system. Unless specific reference is made, FIGS. 5A and 5B will be described generally and FIGS. 5C and 5D will be described generally.

Features of the porous gas bearing 100 may be the same as or similar to features of the porous gas bearing 30 (FIGS. 2A, 2B), the features of the porous gas bearing 60 (FIGS. 3A, 3B), and the features of the porous gas bearing 80 (FIGS. 4A, 4B).

With reference to FIGS. 5A and 5B, the illustrated damping system includes a plurality of damping structures 104A. The damping structures 104A may alternatively be referred to as the squeeze film 104A. In the illustrated damping system, the damping structures 104A are hermetically sealed damping structures 104A. Four damping structures 104A are illustrated. It will be appreciated that a number of the damping structures 104A can vary.

The damping structure 104A has a housing 106A with a fluid 108A filled within the housing 106A. The housing 106A is flexible. A flexibility of the housing 106A as well as the properties of the fluid 108A within the housing 106A can determine a stiffness of the damping structure 104A. The stiffness of the damping structure 104A can determine an amount of damping possible by the damping system in FIGS. 5A and 5B. The stiffness and damping may on multiple factors such as, but not limited to, bearing size, bearing clearance, or the like. In an embodiment, the damping structure 104A may have a stiffness coefficient from at or about from $10^6$ MN/m to at or about $10^8$ MN/m and a damping coefficient from at or about 10 N*s/m to at or about $6 \times 10^5$ N*s/m, depending on the bearing clearance and size.

With reference to FIGS. 5C and 5D, the illustrated damping system includes a plurality of damping structures 104B. The damping structures 104B may alternatively be referred to as the squeeze film 104B. In the illustrated damping system, the damping structures 104B are not hermetically sealed damping structures 104B. Four damping structures 104B are illustrated. It will be appreciated that a number of the damping structures 104B can vary.

The damping structure 104B has a housing 106B with a fluid 108B filled within the housing 106B. Different from the damping structure 104A in FIGS. 5A and 5B, the damping structure 104B includes a fluid inlet 110 and orifice 112. Fluid 108B is provided to the housing 106B. In an embodiment, the fluid 108B may be the same as the fluid F that is provided to the porous gas surface 36. In such an embodiment, the fluid 108B can be refrigerant. It will be appreciated that fluid inlet 110 allows fluid to move both into the orifice 112 and out of the orifice 112.

The housing 106B is flexible. A flexibility of the housing 106B as well as the properties of the fluid 108B, amount of the fluid 108B, and pressure of the fluid 108B within the housing 106B can determine a stiffness of the damping structure 104B. The stiffness of the damping structure 104B can determine an amount of damping possible by the damping system in FIGS. 5C and 5D. The damping structure 104B may have a variable stiffness based on the feeding of the fluid 108B into the housing 106B.

According to an embodiment, the damping systems of the porous gas bearing 100 in FIGS. 5A-5D and the damping systems of the porous gas bearings 30, 60, and 80 can be combined in a single embodiment to include the dampers 38, the biasing member 64, the biasing members 84, and the damping structures 104A or 104B.

Figure 6A:
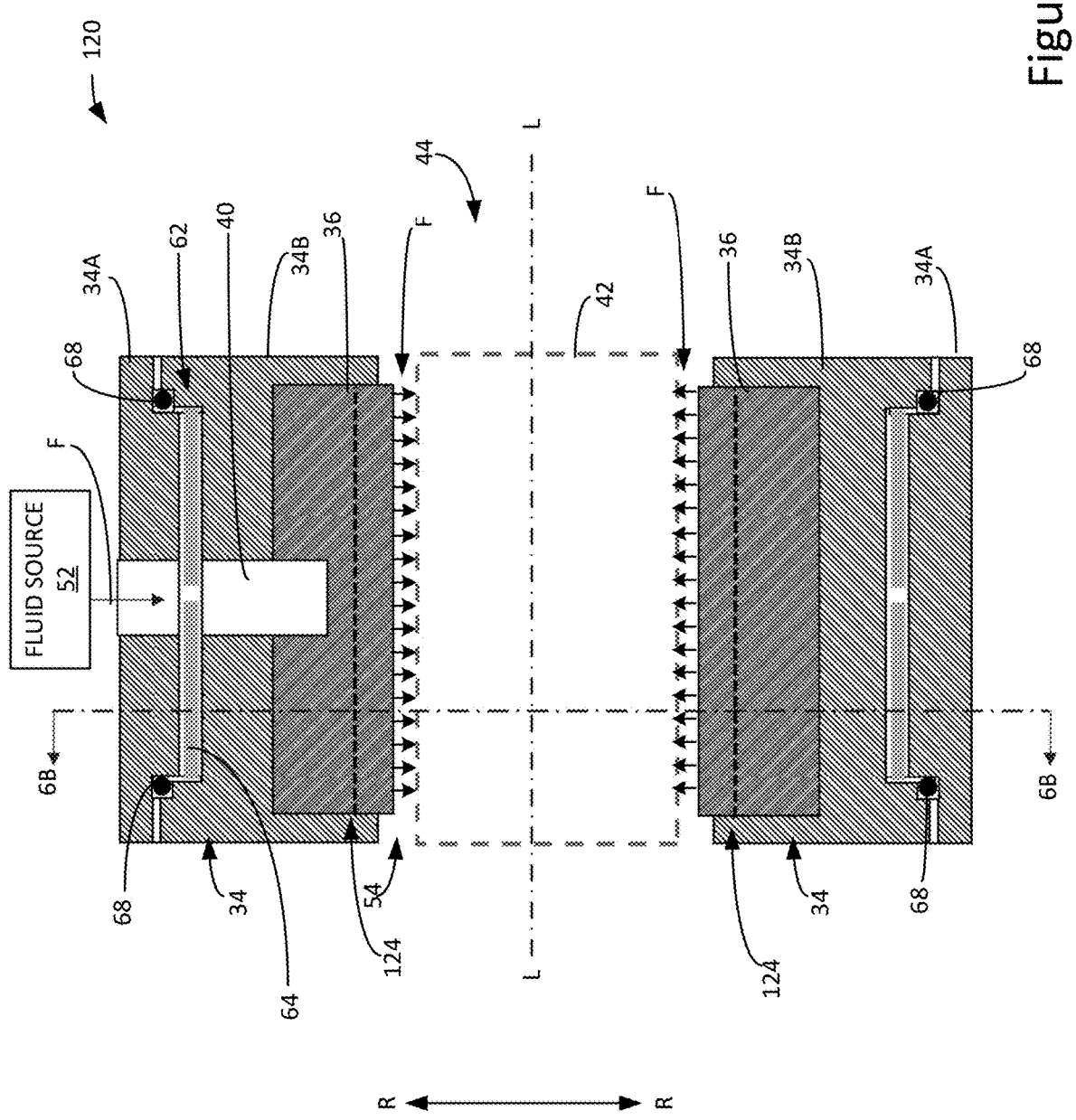
FIGS. 6A and 6B are schematic views of a porous gas bearing having a damping system, according to an embodiment.
Figure 6B:
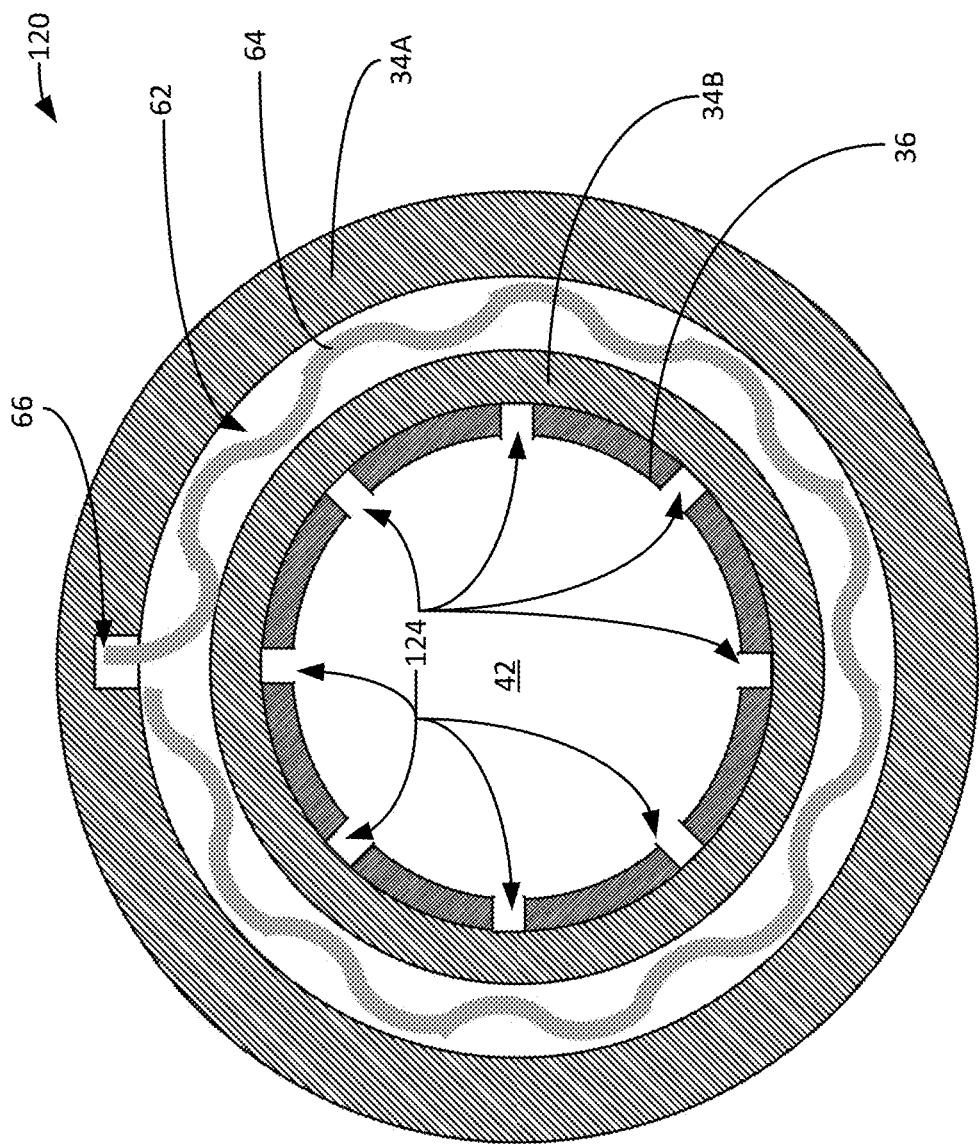

FIGS. 6A and 6B show a porous gas bearing 120 with a damping system, according to an embodiment. FIG. 6A is an axial cross-section of the porous gas bearing 120 along the longitudinal axis L-L of the shaft 42. FIG. 6B is a radial cross-section of the porous gas bearing 120. The porous gas bearing 120 and damping system are substantially the same as the porous gas bearing 60 and the damping system 62 in FIGS. 3A, 3B. Unless specific reference is made, FIGS. 6A and 6B will be described generally.

In the illustrated embodiment, the porous surface layer 36 includes a plurality of grooves 124. The grooves 124 can be formed radially about the porous gas bearing 120. The grooves 124 extend axially within the porous gas bearing 120. The grooves 124 can prevent a swirling of the fluid.

Figure 7:
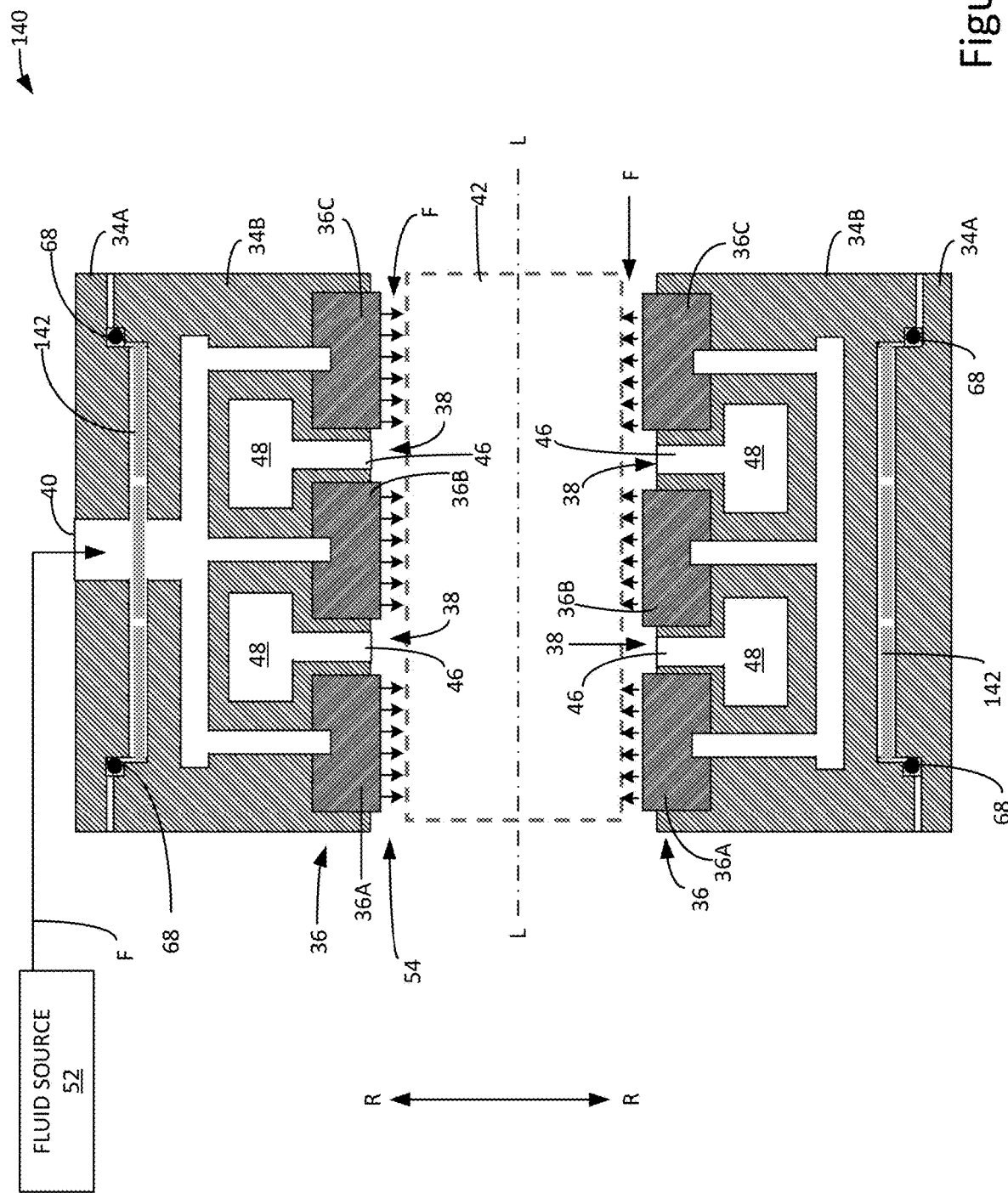
FIG. 7 is a schematic view of a porous gas bearing having a damping system, according to an embodiment.

FIG. 7 is a schematic view of a porous gas bearing 140 having a damping system, according to an embodiment. FIG. 7 is an axial cross-section of the porous gas bearing 140, according to an embodiment.

The porous gas bearing 140 in FIG. 7 can be utilized in a compressor (e.g., compressor 12 in FIG. 1) of a refrigerant circuit (e.g., refrigerant circuit 10 in FIG. 1) of an HVACR system.

The porous gas bearing 140 is substantially the same as the porous gas bearing 30 in FIGS. 2A, 2B. In the porous gas bearing 140, the damping system includes a combination of the damping systems in FIGS. 2A-5D. In the porous gas bearing 140, the dampers 38 are included along with an additional damper 142. The additional damper 142 can be selected from the damping systems that are described in FIGS. 3A-5D. Accordingly, the damper 142 can include one or more of the spring 64, the O-ring 84, the damping structures 104A, or the damping structures 104B. In an embodiment, the grooves 124 (FIGS. 6A, 6B) can be included in the porous gas bearing 140.

Figure 8A:
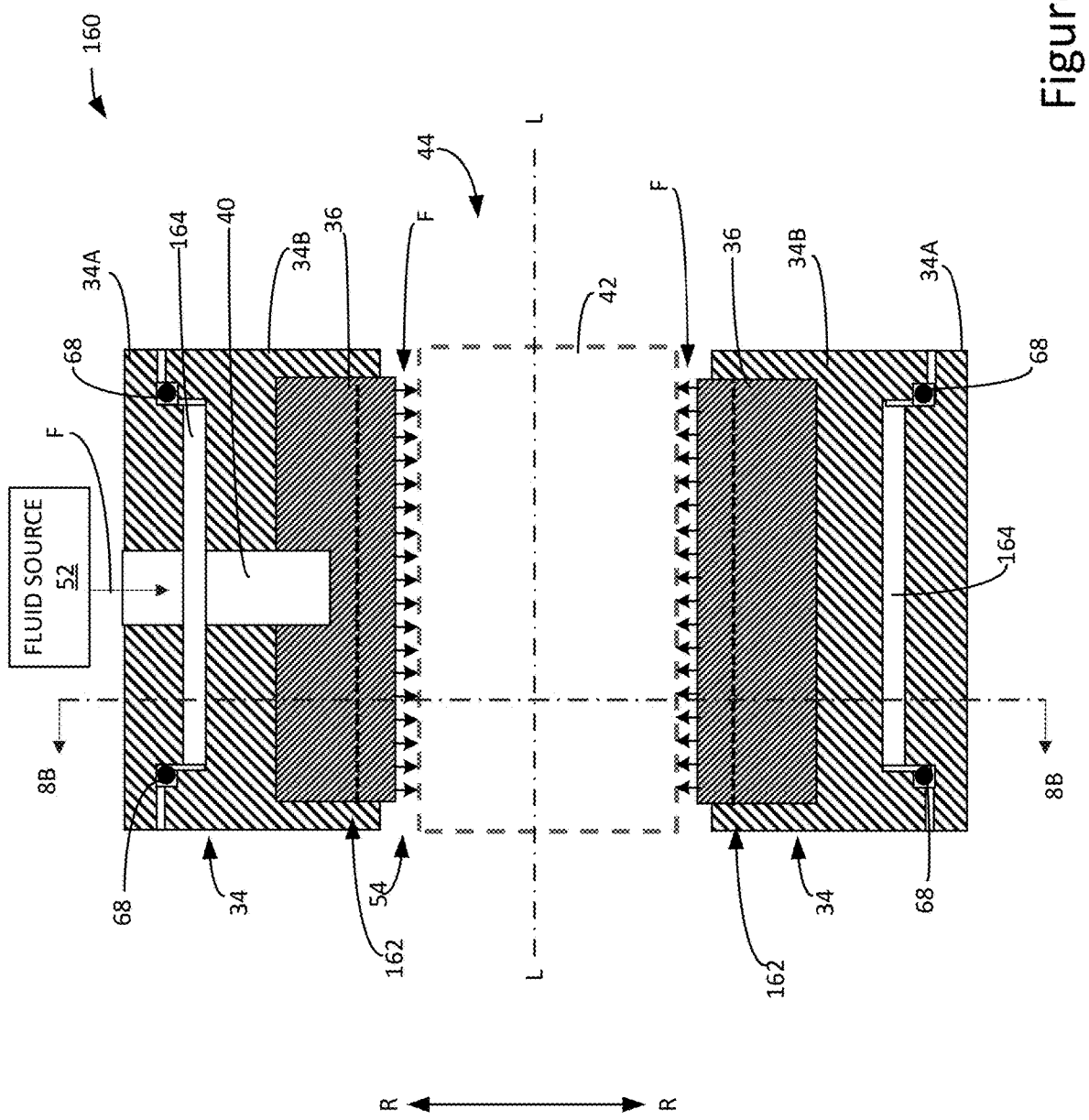
FIGS. 8A and 8B are schematic views of a porous gas bearing having a damping system, according to an embodiment.
Figure 8B:
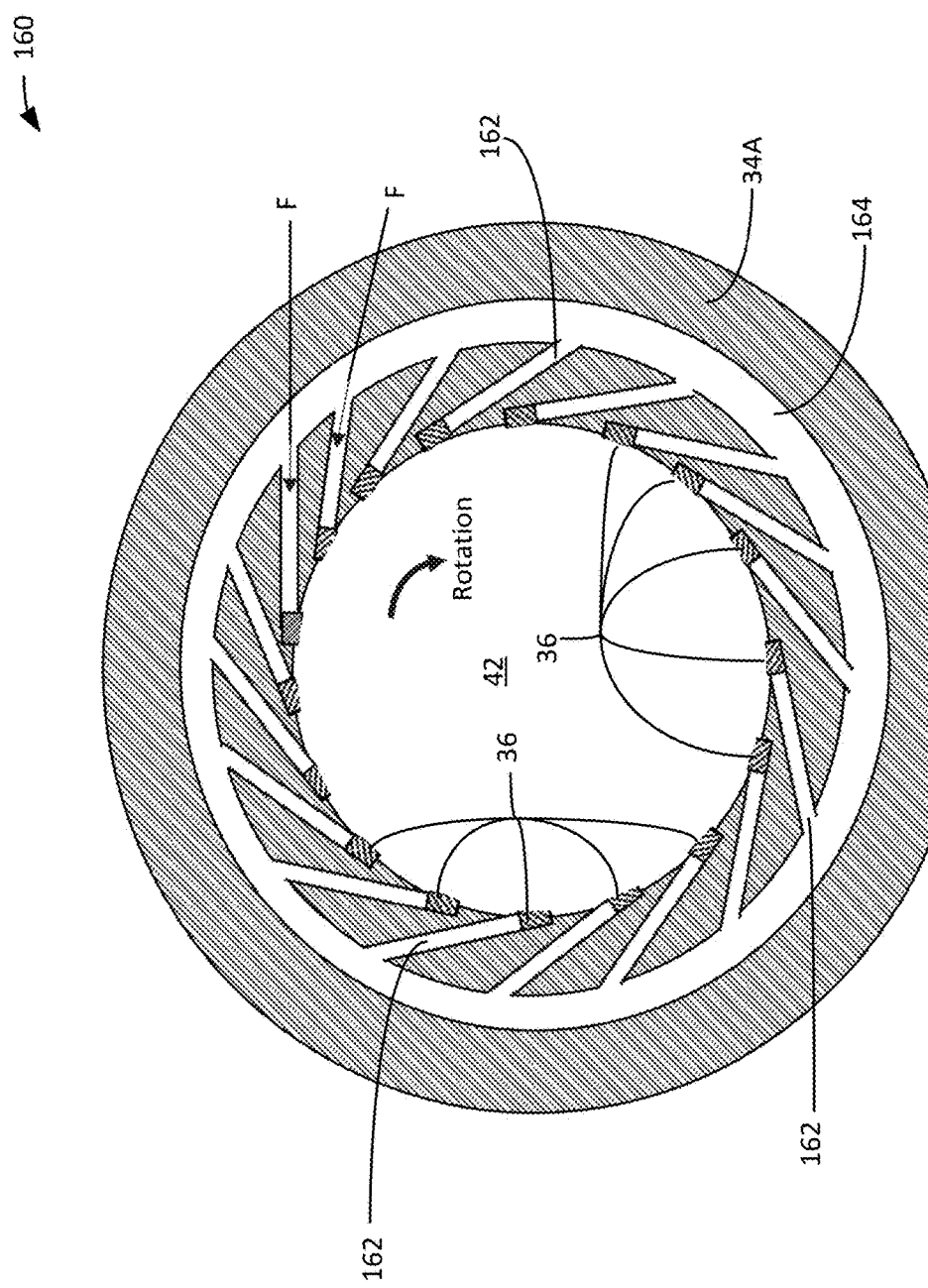

FIGS. 8A and 8B are schematic views of a porous gas bearing 160 having a damping system, according to an embodiment. FIG. 8A is an axial cross-section of the porous gas bearing 160 along the longitudinal axis L-L of the shaft 42. FIG. 8B is a radial cross-section of the porous gas bearing 160. Unless specific reference is made, FIGS. 8A and 8B will be described generally.

Features of the porous gas bearing 160 may be the same as or similar to features of the porous gas bearings shows and described in accordance with FIGS. 2A-7 above. Such features are identified with like reference numbers.

In the illustrated embodiment, the housing 34 is modified to include a plurality of apertures 162 that fluidly communicate with the passageway 164. The apertures 162 extend to the porous surface layer 36 at an angle that is oriented to provide the fluid F in a direction that is against the direction of rotation of the shaft 42. Providing the fluid F at such an angle can, for example, reduce instability of the shaft 42, and accordingly, reduce an amount of movement in the radial direction R of the shaft.

Figure 9A:
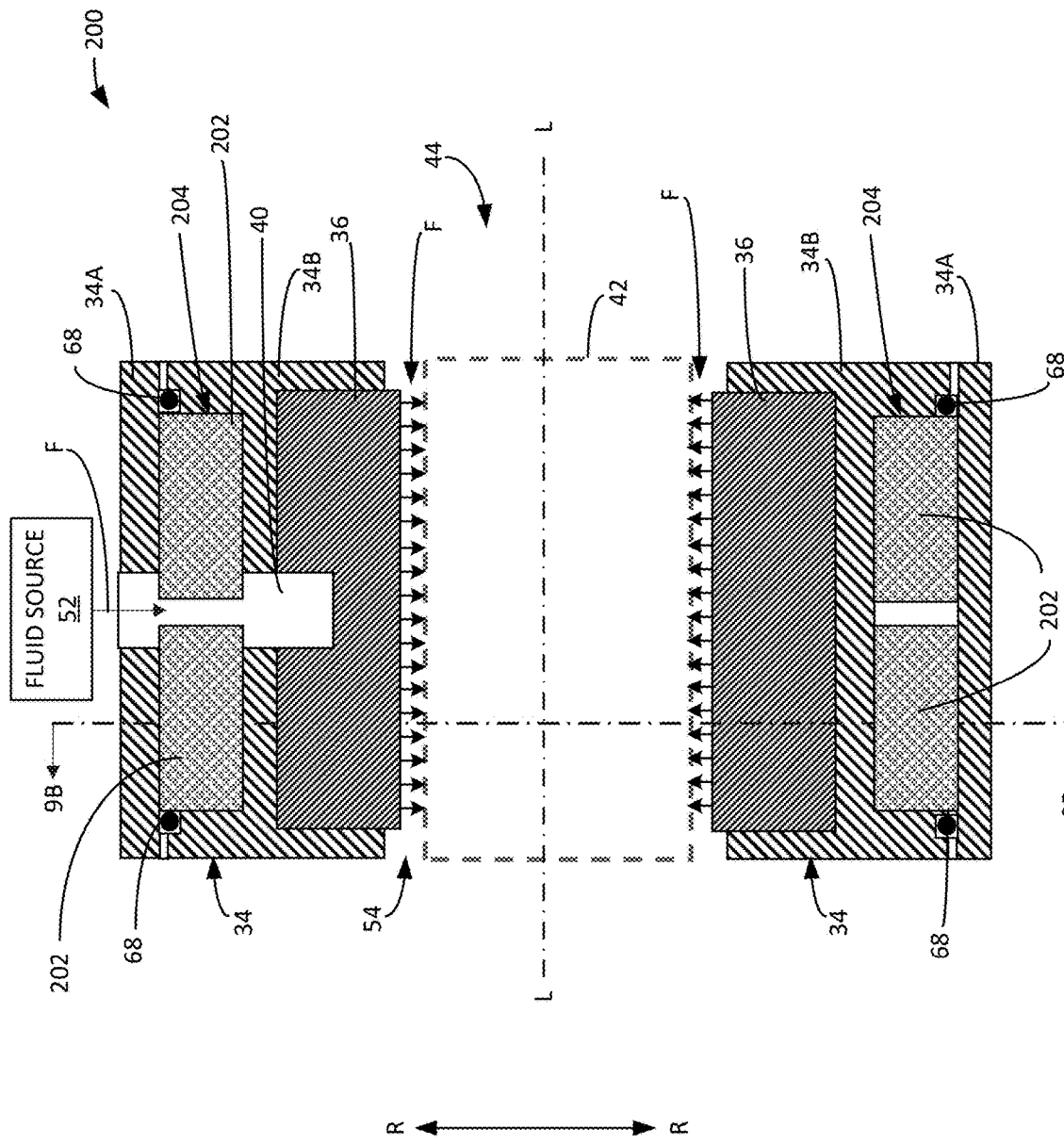
FIGS. 9A and 9B are schematic views of a porous gas bearing having a damping system, according to an embodiment.
Figure 9B:
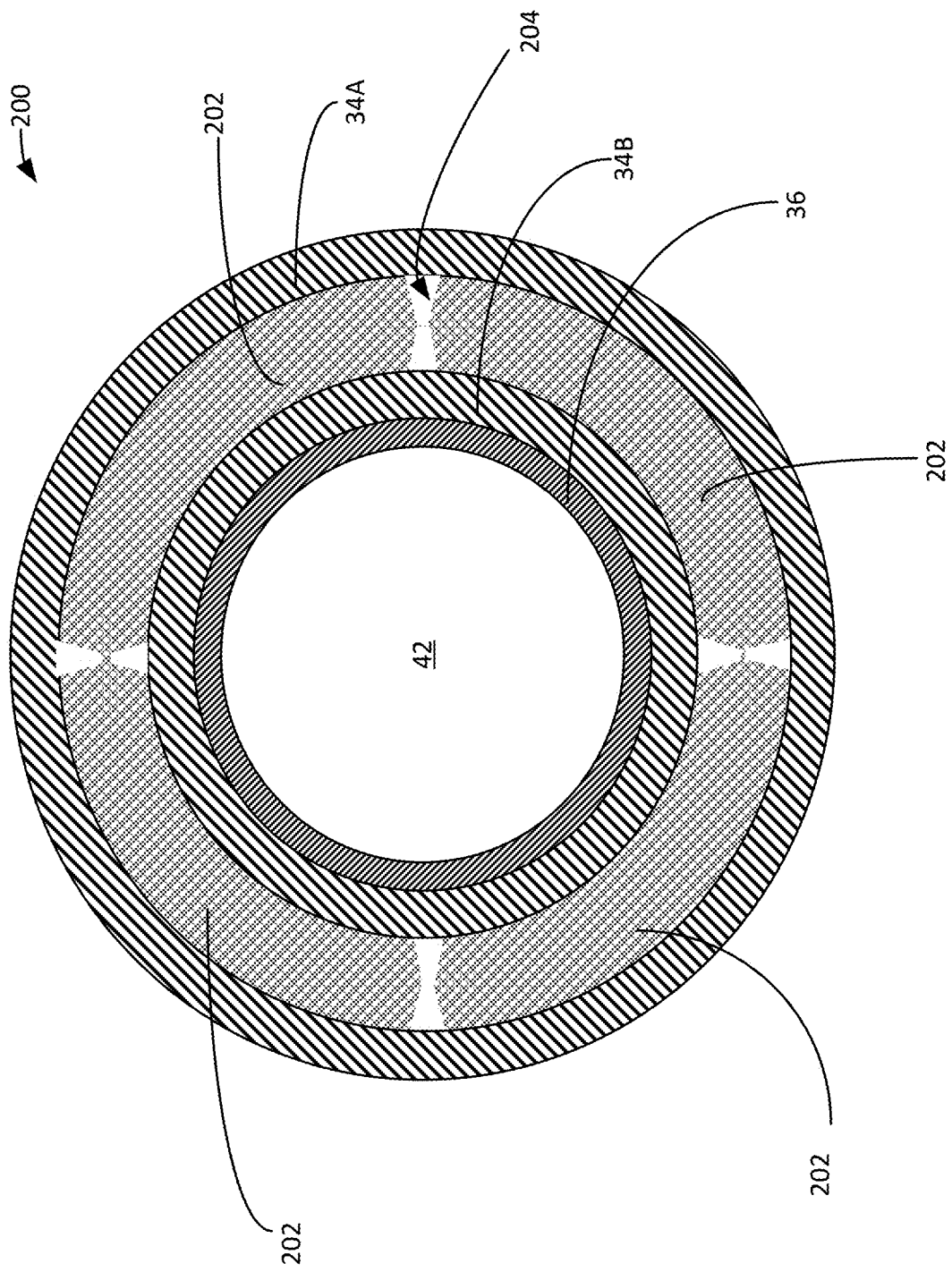

FIGS. 9A and 9B are schematic views of a porous gas bearing 200 having a damping system, according to an embodiment. FIG. 9A is an axial cross-section of the porous gas bearing 200 along the longitudinal axis L-L of the shaft 42. FIG. 9B is a radial cross-section of the porous gas bearing 200. Unless specific reference is made, FIGS. 9A and 9B will be described generally.

Features of the porous gas bearing 200 may be the same as or similar to features of the porous gas bearings shown and described above in accordance with FIGS. 2A-7. Such features are labeled with like reference numbers.

In the illustrated embodiment, the damping system includes a damper 202 disposed in a passageway 204. In an embodiment, the damper 202 can include a wire mesh material. The wire mesh material can be made of a metal or a plastic. The wire mesh material can be knitted to form the mesh structure. The knitting of the material can provide a resiliency. The wire mesh material can be included in the passageway 204 so that movement of the shaft 42 in the radial direction R can be absorbed. The damper 202 can be a relatively cheaper alternative to the damping structures 104 (e.g., squeeze film) in the porous gas bearing 200. A material for the wire mesh material of the damper 202 can be selected so that a particular damping can be provided in the porous gas bearing 200. Suitable materials include, but are not limited to, steel, steel alloys, aluminum, copper, nickel alloys, titanium alloys, nylon, polyethylene, or the like.

According to an embodiment, the damping system of the porous gas bearing 200 and the damping system of the porous gas bearings in FIGS. 2A-7 can be combined in a single embodiment to include the dampers 38, the biasing member 64, the biasing members 84, and the damper 202.

Aspects

It is to be appreciated that any one of aspects 1-9 can be combined with any one of aspects 10-15, 16-20, 21-29, 30-35, and 36-40. Any one of aspects 10-15 can be combined with any one of aspects 16-20, 21-29, 30-35, and 36-40. Any one of aspects 16-20 can be combined with any one of aspects 21-29, 30-35, and 36-40. Any one of aspects 21-29 can be combined with any one of aspects 30-35 and 36-40. Any one of aspects 30-35 can be combined with any one of aspects 36-40.

Aspect 1. A porous gas bearing, comprising: a housing having a fluid inlet and an aperture; a porous surface layer disposed within the housing surrounding the aperture in a circumferential direction, the porous surface layer including a plurality of segments arranged in a longitudinal direction of the aperture, the porous surface layer in fluid communication with the fluid inlet; and a damping system including a plurality of dampers, the plurality of dampers being disposed circumferentially about the aperture, wherein the plurality of dampers are arranged in between a first segment of the plurality of segments of the porous surface layer and a second segment of the plurality of segments of the porous surface layer.

Aspect 2. The porous gas bearing according to aspect 1, wherein the fluid inlet is fluidly connected to a refrigerant circuit.

Aspect 3. The porous gas bearing according to aspect 2, wherein the fluid inlet is fluidly connected to the refrigerant circuit at a location between a condenser and expansion device of the refrigerant circuit or at a discharge location of a compressor in the refrigerant circuit.

Aspect 4. The porous gas bearing according to any one of aspects 1-3, further comprising a plurality of grooves in the porous surface layer.

Aspect 5. The porous gas bearing according to any one of aspects 1-4, wherein the plurality of dampers include a damper inlet and a damper chamber, the damper inlet being disposed at the aperture, and the damper chamber disposed radially outward from the damper inlet.

Aspect 6. The porous gas bearing according to any one of aspects 1-5, wherein the porous surface layer is made of a carbon-graphite material.

Aspect 7. The porous gas bearing according to any one of aspects 1-6, wherein the plurality of dampers include a damper inlet and a damper chamber, the damper inlet being disposed at the aperture, and the damper chamber disposed radially outward from the damper inlet, and the damper chamber is capped.

Aspect 8. The porous gas bearing according to any one of aspects 1-7, wherein the plurality of dampers include a damper inlet and a damper chamber, the damper inlet being disposed at the aperture, and the damper chamber disposed radially outward from the damper inlet, and the damper chamber includes a fluid outlet and an orifice in the fluid outlet, the fluid outlet being disposed radially outward from the aperture relative to the damper chamber.

Aspect 9. The porous gas bearing according to any one of aspects 1-8, the damper system further comprising one or more of a spring, an O-ring, a squeeze film, and a wire mesh.

Aspect 10. A refrigerant circuit, comprising: a compressor, a condenser, an expansion device, and an evaporator fluidly connected, wherein the compressor includes a shaft, the shaft being supported by a porous gas bearing, the porous gas bearing including: a housing having a fluid inlet and an aperture; a porous surface layer disposed within the housing surrounding the aperture in a circumferential direction, the porous surface layer including a plurality of segments arranged in a longitudinal direction of the aperture, the porous surface layer in fluid communication with the fluid inlet; and a damping system including a plurality of dampers, the plurality of dampers being disposed circumferentially about the aperture in the housing, wherein the plurality of dampers are arranged in between a first segment of the plurality of segments of the porous surface layer and a second segment of the plurality of segments of the porous surface layer.

Aspect 11. The refrigerant circuit according to aspect 10, wherein the porous gas bearing is fluidly connected to the refrigerant circuit.

Aspect 12. The refrigerant circuit according to one of aspects 10 or 11, further comprising a fluid source that is fluidly separate from the refrigerant circuit, the fluid source being fluidly connected to the porous gas bearing.

Aspect 13. The refrigerant circuit according to any one of aspects 10-12, wherein the damper system further comprises one or more of a spring, an O-ring, a squeeze film, and a wire mesh.

Aspect 14. The refrigerant circuit according to any one of aspects 10-13, wherein the porous gas bearing is fluidly connected to the refrigerant circuit at a location configured to receive a mixed gas and liquid fluid from the refrigerant circuit.

Aspect 15. The refrigerant circuit according to any one of aspects 10-14, wherein the refrigerant circuit is a lubricant free refrigerant circuit.

Aspect 16. A centrifugal compressor, comprising: a shaft that rotates; and a porous gas bearing, the porous gas bearing including: a housing having a fluid inlet and an aperture; a porous surface layer disposed within the housing surrounding the aperture in a circumferential direction, the porous surface layer including a plurality of segments arranged in a longitudinal direction of the aperture, the porous surface layer in fluid communication with the fluid inlet; and a damping system including a plurality of dampers, the plurality of dampers being disposed circumferentially about the aperture in the housing, wherein the plurality of dampers are arranged in between a first segment of the plurality of segments of the porous surface layer and a second segment of the plurality of segments of the porous surface layer.

Aspect 17. The centrifugal compressor according to aspect 16, wherein the damper system further comprises one or more of a spring, an O-ring, a squeeze film, and a wire mesh.

Aspect 18. The centrifugal compressor according to one of aspects 16 or 17, wherein the shaft is configured to rotate from at or about 10,000 revolutions per minute to at or about 150,000 revolutions per minute.

Aspect 19. The centrifugal compressor according to any one of aspects 16-18, wherein the porous gas bearing is a radial bearing that supports the shaft.

Aspect 20. The centrifugal compressor according to any one of aspects 16-19, wherein the plurality of dampers include a damper inlet and a damper chamber, the damper inlet being disposed at the aperture, and the damper chamber disposed radially outward from the damper inlet.

Aspect 21. A porous gas bearing, comprising: a housing having a fluid inlet and an aperture; a porous surface layer disposed within the housing surrounding the aperture in a circumferential direction, the porous surface layer in fluid communication with the fluid inlet; and a damping system including a biasing member, the biasing member being disposed in a passageway that extends along the longitudinal direction of the aperture and circumferentially about the aperture, wherein the biasing member is arranged radially outward from the porous surface layer.

Aspect 22. The porous gas bearing according to aspect 21, wherein the fluid inlet is fluidly connected to a refrigerant circuit.

Aspect 23. The porous gas bearing according to aspect 22, wherein the fluid inlet is fluidly connected to the refrigerant circuit at a location between a condenser and expansion device of the refrigerant circuit or at a discharge location of a compressor in the refrigerant circuit.

Aspect 24. The porous gas bearing according to any one of aspects 21-23, further comprising a plurality of grooves in the porous surface layer.

Aspect 25. The porous gas bearing according to any one of aspects 21-24, wherein the biasing member includes a spring.

Aspect 26. The porous gas bearing according to any one of aspects 21-25, wherein the porous surface layer is made of a carbon-graphite material.

Aspect 27. The porous gas bearing according to any one of aspects 21-26, wherein the biasing member includes a wave spring.

Aspect 28. The porous gas bearing according to any one of aspects 21-27, further comprising a plurality of dampers, the plurality of dampers being disposed circumferentially about the aperture in the housing.

Aspect 29. The porous gas bearing according to any one of aspects 21-28, the damper system further comprising one or more of an O-ring, a squeeze film, and a wire mesh.

Aspect 30. A refrigerant circuit, comprising: a compressor, a condenser, an expansion device, and an evaporator fluidly connected, wherein the compressor includes a shaft, the shaft being supported by a porous gas bearing, the porous gas bearing including: a housing having a fluid inlet and an aperture; a porous surface layer disposed within the housing surrounding the aperture in a circumferential direction, the porous surface layer in fluid communication with the fluid inlet; and a damping system including a biasing member, the biasing member being disposed in a passageway that extends along the longitudinal direction of the aperture and circumferentially about the aperture, wherein the biasing member is arranged radially outward from the porous surface layer.

Aspect 31. The refrigerant circuit according to aspect 30, wherein the porous gas bearing is fluidly connected to the refrigerant circuit.

Aspect 32. The refrigerant circuit according to one of aspects 30 or 31, further comprising a fluid source that is fluidly separate from the refrigerant circuit, the fluid source being fluidly connected to the porous gas bearing.

Aspect 33. The refrigerant circuit according to any one of aspects 30-32, wherein the damper system further comprises one or more of an O-ring, a squeeze film, and a wire mesh.

Aspect 34. The refrigerant circuit according to any one of aspects 30-33, wherein the porous gas bearing is fluidly connected to the refrigerant circuit at a location configured to receive a mixed gas and liquid fluid from the refrigerant circuit.

Aspect 35. The refrigerant circuit according to any one of aspects 30-34, wherein the refrigerant circuit is a lubricant free refrigerant circuit.

Aspect 36. A centrifugal compressor, comprising: a shaft that rotates; and a porous gas bearing, the porous gas bearing including: a housing having a fluid inlet and an aperture; a porous surface layer disposed within the housing surrounding the aperture in a circumferential direction, the porous surface layer in fluid communication with the fluid inlet; and a damping system including a biasing member, the biasing member being disposed in a passageway that extends along the longitudinal direction of the aperture and circumferentially about the aperture, wherein the biasing member is arranged radially outward from the porous surface layer.

Aspect 37. The centrifugal compressor according to aspect 36, wherein the damper system further comprises one or more of an O-ring, a squeeze film, and a wire mesh.

Aspect 38. The centrifugal compressor according to one of aspects 36 or 37, wherein the shaft is configured to rotate from at or about 10,000 revolutions per minute to at or about 150,000 revolutions per minute.

Aspect 39. The centrifugal compressor according to any one of aspects 36-38, wherein the porous gas bearing is a radial bearing that supports the shaft.

Aspect 40. The centrifugal compressor according to any one of aspects 36-39, wherein the biasing member is pretensioned to provide a selected amount of damping.

The terminology used in this specification is intended to describe particular embodiments and is not intended to be limiting. The terms "a," "an," and "the" include plural forms as well, unless clearly indicated otherwise. The terms "comprises" and/or "comprising," when used, indicated the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" may, but does not necessarily, refer to the same embodiment. The embodiments and disclosure are examples only. Other and further embodiments may be devised without departing from the basic scope thereof, with the true scope and spirit of the disclosure being indicated by the claims that follow.

What is claimed is:

1. A porous gas bearing, comprising:
    a housing having a fluid inlet, a passageway, and an aperture, the housing including a first segment and a second segment disposed radially inward of the first segment, and the passageway extending along a longitudinal direction of the aperture, circumferentially about the aperture, and between the first segment and the second segment;
    a porous surface layer disposed within the housing surrounding the aperture in a circumferential direction, the porous surface layer in fluid communication with the fluid inlet; and
    a damping system including one or more biasing members, the one or more biasing members being disposed in the passageway and extend circumferentially along a majority of a circumference of the aperture, wherein the one or more biasing members are arranged radially outward from the porous surface layer.

2. The porous gas bearing according to claim 1, wherein the fluid inlet is fluidly connected to a refrigerant circuit.

3. The porous gas bearing according to claim 2, wherein the fluid inlet is fluidly connected to the refrigerant circuit at a location between a condenser and expansion device of the refrigerant circuit or at a discharge location of a compressor in the refrigerant circuit.

4. The porous gas bearing according to claim 1, further comprising a plurality of grooves in the porous surface layer.

5. The porous gas bearing according to claim 1, wherein the one or more biasing members include a spring.

6. The porous gas bearing according to claim 1, wherein the porous surface layer is made of a carbon-graphite material.

7. The porous gas bearing according to claim 1, wherein the one or more biasing members include a wave spring.

8. The porous gas bearing according to claim 1, further comprising a plurality of dampers, the plurality of dampers being disposed circumferentially about the aperture in the housing.

9. The porous gas bearing according to claim 1, the damping system further comprising one or more of an O-ring, a squeeze film, and a wire mesh.

10. A refrigerant circuit, comprising:
    a compressor, a condenser, an expansion device, and an evaporator fluidly connected,
    wherein the compressor includes a shaft, the shaft being supported by a porous gas bearing, the porous gas bearing including:
    a housing having a fluid inlet, a passageway, and an aperture, the housing including a first segment and a second segment disposed radially inward of the first segment, the passageway extending along a longitudinal direction of the aperture, circumferentially about the aperture, and between the first segment and the second segment;
    a porous surface layer disposed within the housing surrounding the aperture in a circumferential direction, the porous surface layer in fluid communication with the fluid inlet; and
    a damping system including one or more biasing members, the one or more biasing members being disposed in the passageway and extend circumferentially along a majority of a circumference of the aperture, wherein the one or more biasing members are arranged radially outward from the porous surface layer.

11. The refrigerant circuit according to claim 10, wherein the porous gas bearing is fluidly connected to the refrigerant circuit.

12. The refrigerant circuit according to claim 10, further comprising a fluid source that is fluidly separate from the refrigerant circuit, the fluid source being fluidly connected to the porous gas bearing.

13. The refrigerant circuit according to claim 10, wherein the damping system further comprises one or more of an O-ring, a squeeze film, and a wire mesh.

14. The refrigerant circuit according to claim 10, wherein the porous gas bearing is fluidly connected to the refrigerant circuit at a location configured to receive a mixed gas and liquid fluid from the refrigerant circuit.

15. The refrigerant circuit according to claim 10, wherein the refrigerant circuit is a lubricant free refrigerant circuit.

16. A centrifugal compressor, comprising:
a shaft that rotates; and
a porous gas bearing, the porous gas bearing including:
  a housing having a fluid inlet, a passageway, and an aperture, the housing including a first segment and a second segment disposed radially inward of the first segment, the passageway extending along a longitudinal direction of the aperture, circumferentially about the aperture, and between the first segment and the second segment;
  a porous surface layer disposed within the housing surrounding the aperture in a circumferential direction, the porous surface layer in fluid communication with the fluid inlet; and
  a damping system including one or more biasing members, the one or more biasing members being disposed in the passageway and extend circumferentially along a majority of a circumference of the aperture, wherein the one or more biasing members are arranged radially outward from the porous surface layer.

17. The centrifugal compressor according to claim 16, wherein the damping system further comprises one or more of an O-ring, a squeeze film, and a wire mesh.

18. The centrifugal compressor according to claim 16, wherein the shaft is configured to rotate from at or about 10,000 revolutions per minute to at or about 150,000 revolutions per minute.

19. The centrifugal compressor according to claim 16, wherein the porous gas bearing is a radial bearing that supports the shaft, and a radial cross sectional shape of the second segment is circular.

20. The centrifugal compressor according to claim 16, wherein the one or more biasing members are pre-tensioned to provide a selected amount of damping.

* * * * *